(12) United States Patent
Abotabl et al.

(10) Patent No.: US 11,956,728 B2
(45) Date of Patent: Apr. 9, 2024

(54) DOWNLINK POWER ADAPTATION FOR FULL-DUPLEX SYSTEMS

(71) Applicant: QUALCOMM Incorporated, San Diego, CA (US)

(72) Inventors: Ahmed Attia Abotabl, San Diego, CA (US); Abdelrahman Mohamed Ahmed Mohamed Ibrahim, San Diego, CA (US); Muhammad Sayed Khairy Abdelghaffar, San Jose, CA (US); Huilin Xu, Temecula, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 532 days.

(21) Appl. No.: 17/242,024

(22) Filed: Apr. 27, 2021

(65) Prior Publication Data

US 2022/0346024 A1 Oct. 27, 2022

(51) Int. Cl.
*H04W 52/14* (2009.01)
*H04L 5/14* (2006.01)
*H04W 72/23* (2023.01)

(52) U.S. Cl.
CPC ............ *H04W 52/143* (2013.01); *H04L 5/14* (2013.01); *H04W 72/23* (2023.01)

(58) Field of Classification Search
CPC ........... H04W 52/281; H04W 72/0473; H04W 52/34; H04W 72/56; H04W 52/346; H04W 52/365; H04W 52/367; H04W 52/146; H04W 88/06; H04W 52/40; H04W 52/325; H04W 72/23; H04W 52/38; H04W 72/04; H04W 52/18; H04W 52/30; H05K 999/99; H04L 5/001; H04L 5/0003; H04L 5/005; H04L 1/1812; H04J 1/00; H04J 11/00
See application file for complete search history.

(56) References Cited

U.S. PATENT DOCUMENTS

2021/0091918 A1  3/2021  Lee et al.

FOREIGN PATENT DOCUMENTS

WO   WO-2021035457 A1   3/2021

OTHER PUBLICATIONS

International Search Report and Written Opinion—PCT/US2022/070848—ISA/EPO—dated Jun. 9, 2022.

*Primary Examiner* — Jung Liu
(74) *Attorney, Agent, or Firm* — Holland & Hart LLP

(57) ABSTRACT

Methods, systems, and devices for wireless communications are described. A user equipment (UE) supporting full duplex communications may determine that a set of downlink messages to be transmitted from a base station to the UE overlaps in time with a set of uplink messages to be transmitted from the UE. Accordingly, the UE may determine a downlink transmission power adjustment value for the set of downlink messages. In some examples, the base station may indicate the downlink transmission power adjustment value to the UE via radio resource control (RRC) signaling, a downlink control information (DCI) message, or both. The UE may transmit the set of uplink messages while simultaneously receiving the set of downlink messages with a transmission power that corresponds to the downlink transmission power adjustment value. Adjusting the transmission power for the set of downlink messages may reduce self-interference at the UE, the base station, or both.

30 Claims, 18 Drawing Sheets

DOWNLINK POWER ADAPTATION FOR FULL-DUPLEX SYSTEMS

FIELD OF TECHNOLOGY

The following relates to wireless communications, including downlink power adaptation for full-duplex systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a communication device (e.g., a UE, a base station) may experience self-interference while performing full-duplex communications with other communication devices. This self-interference may decrease the reliability and efficiency of the full-duplex communications.

SUMMARY

The described techniques relate to improved methods, systems, devices, and apparatuses that support downlink power adaptation for full-duplex systems. Generally, the described techniques provide for reducing adverse effects of self-interference on full-duplex communications at a communication device (e.g., a user equipment (UE), a base station) based on adjusting a downlink transmission power for the full-duplex communications. In accordance with aspects of the present disclosure, a UE supporting full-duplex communications may be scheduled to receive a set of downlink messages and transmit a set of uplink messages. In some examples, the set of downlink messages may at least partially overlap in time with the set of uplink messages. The UE may determine an adjusted downlink transmission power for at least a subset of the downlink messages based on determining that the set of downlink messages overlaps in time with the set of uplink messages. In particular, the downlink transmission power may be adjusted (or, in some examples, may remain the same as a previously-configured downlink transmission power) based on whether the scheduled uplink and downlink messages overlap. Accordingly, the UE may transmit the set of uplink messages while simultaneously receiving the set of downlink messages having the adjusted downlink transmission power.

In some examples, the adjusted downlink transmission power may be based on one or more communication parameters, which may include a downlink resource allocation corresponding to the set of downlink messages, an uplink resource allocation corresponding to the set of uplink messages, a modulation and coding scheme (MCS), a set of channel measurements, a reference signal received power (RSRP), a received signal strength indicator (RSSI), a self-interference measurement, or a combination thereof. In some examples, the UE may determine the adjusted downlink transmission power based on a messages (e.g., a downlink control information (DCI) message) indicating a downlink transmission power adjustment, one or more tables (e.g., time-domain resource allocation (TDRA) tables) configured via radio resource control (RRC) signaling, a priority level associated with the set of downlink messages, a priority level associated with the set of uplink messages, a set of configured rules, or any combination thereof. Receiving the set of downlink messages with the adjusted downlink transmission power (e.g., a relatively increased downlink transmission power) may enable the UE to more effectively mitigate self-interference and perform full-duplex communications with improved reliability, among other benefits. In other examples, an adjusted downlink transmission power (e.g., a relatively reduced downlink transmission power) may enable the base station to more effectively mitigate self-interference for full-duplex communications at the base station.

A method for wireless communication at a UE is described. The method may include determining that one or more downlink messages to be received from a base station at least partially overlap in time with one or more uplink messages to be transmitted by the UE based on the UE supporting full-duplex communications, determining a value of a downlink transmission power adjustment for the one or more downlink messages, where the downlink transmission power adjustment is based on the one or more downlink messages at least partially overlapping in time with the one or more uplink messages, and receiving the one or more downlink messages while simultaneously transmitting the one or more uplink messages, where a downlink transmission power of at least one downlink message of the one or more downlink messages is based on the value of the downlink transmission power adjustment.

An apparatus for wireless communication at a UE is described. The apparatus may include a processor, memory coupled with the processor, and instructions stored in the memory. The instructions may be executable by the processor to cause the apparatus to determine that one or more downlink messages to be received from a base station at least partially overlap in time with one or more uplink messages to be transmitted by the UE based on the UE supporting full-duplex communications, determine a value of a downlink transmission power adjustment for the one or more downlink messages, where the downlink transmission power adjustment is based on the one or more downlink messages at least partially overlapping in time with the one or more uplink messages, and receive the one or more downlink messages while simultaneously transmitting the one or more uplink messages, where a downlink transmission power of at least one downlink message of the one or more downlink messages is based on the value of the downlink transmission power adjustment.

Another apparatus for wireless communication at a UE is described. The apparatus may include means for determining that one or more downlink messages to be received from a base station at least partially overlap in time with one or more uplink messages to be transmitted by the UE based on the UE supporting full-duplex communications, means for determining a value of a downlink transmission power adjustment for the one or more downlink messages, where the downlink transmission power adjustment is based on the one or more downlink messages at least partially overlapping in time with the one or more uplink messages, and means for receiving the one or more downlink messages while simultaneously transmitting the one or more uplink messages, where a downlink transmission power of at least one downlink message of the one or more downlink messages is based on the value of the downlink transmission power adjustment.

A non-transitory computer-readable medium storing code for wireless communication at a UE is described. The code may include instructions executable by a processor to determine that one or more downlink messages to be received from a base station at least partially overlap in time with one or more uplink messages to be transmitted by the UE based on the UE supporting full-duplex communications, determine a value of a downlink transmission power adjustment for the one or more downlink messages, where the downlink transmission power adjustment is based on the one or more downlink messages at least partially overlapping in time with the one or more uplink messages, and receive the one or more downlink messages while simultaneously transmitting the one or more uplink messages, where a downlink transmission power of at least one downlink message of the one or more downlink messages is based on the value of the downlink transmission power adjustment.

In some examples of the method, apparatuses, and non-transitory computer-readable medium described herein, determining the value of the downlink transmission power adjustment may include operations, features, means, or instructions for receiving, from the base station, a control message indicating the value of the downlink transmission power adjustment, where the value of the downlink transmission power adjustment may be determined based on receiving the control message.

Some examples of the method, apparatuses, and non-transitory computer-readable medium described herein may further include operations, features, means, or instructions for identifying, within the control message, a bit field indicating the value of the downlink transmission power adjustment, where the value of the downlink transmission power adjustment may be from a set of two or more values of the downlink transmission power adjustment that may be configured via RRC signaling.

In some examples of the method, apparatuses, and non-transitory computer-readable medium described herein, the control message includes DCI scheduling the one or more downlink messages from the base station.

In some examples of the method, apparatuses, and non-transitory computer-readable medium described herein, the value of the downlink transmission power adjustment may be based on one or more communications parameters including a downlink resource allocation, an uplink resource allocation, an MCS, one or more channel measurements, an RSRP, an RSSI, one or more self-interference measurements, or any combination thereof.

In some examples of the method, apparatuses, and non-transitory computer-readable medium described herein, determining the value of the downlink transmission power adjustment may include operations, features, means, or instructions for determining the value of the downlink transmission power adjustment based on a rule associated with one or more communications parameters.

Some examples of the method, apparatuses, and non-transitory computer-readable medium described herein may further include operations, features, means, or instructions for receiving RRC signaling configuring the rule and determining the rule based on receiving the RRC signaling.

In some examples of the method, apparatuses, and non-transitory computer-readable medium described herein, the rule may be associated with one or more tables that indicate the value of the downlink transmission power adjustment.

Some examples of the method, apparatuses, and non-transitory computer-readable medium described herein may further include operations, features, means, or instructions for identifying the one or more communications parameters based on the one or more downlink messages at least partially overlapping in time with the one or more uplink messages, the one or more communications parameters including a priority of the one or more uplink messages, a priority of the one or more downlink messages, a downlink resource allocation, an uplink resource allocation, an overlap between the one or more downlink messages and the one or more uplink messages, an MCS associated with the one or more downlink messages, an MCS associated with the one or more uplink messages, a rank associated with the one or more downlink messages, a rank associated with the one or more uplink messages, one or more channel measurements, an RSRP, an RSSI, one or more self-interference measurements, or any combination thereof.

Some examples of the method, apparatuses, and non-transitory computer-readable medium described herein may further include operations, features, means, or instructions for determining that the value of the downlink transmission power adjustment may be applied to each downlink message of the one or more downlink messages.

Some examples of the method, apparatuses, and non-transitory computer-readable medium described herein may further include operations, features, means, or instructions for determining that the value of the downlink transmission power adjustment may be applied to one or more resource blocks (RBs), one or more symbols, or any combination thereof, corresponding to the one or more downlink messages that at least partially overlap with the one or more uplink messages.

Some examples of the method, apparatuses, and non-transitory computer-readable medium described herein may further include operations, features, means, or instructions for determining that the value of the downlink transmission power adjustment may be applied to one or more RBs of the one or more downlink messages based on a rule, the rule being associated with the one or more downlink messages and the one or more uplink messages satisfying a performance threshold.

Some examples of the method, apparatuses, and non-transitory computer-readable medium described herein may further include operations, features, means, or instructions for identifying an increase in the downlink transmission power based on the value of the downlink transmission power adjustment.

Some examples of the method, apparatuses, and non-transitory computer-readable medium described herein may further include operations, features, means, or instructions for identifying a decrease in the downlink transmission power based on the value of the downlink transmission power adjustment.

Some examples of the method, apparatuses, and non-transitory computer-readable medium described herein may further include operations, features, means, or instructions for determining that the downlink transmission power may be unchanged based on the value of the downlink transmission power adjustment.

A method for wireless communication at a base station is described. The method may include determining that one or more downlink messages to be transmitted from the base station at least partially overlap in time with one or more uplink messages to be received from a UE based on the UE supporting full-duplex communications, configuring a value of a downlink transmission power adjustment for the one or more downlink messages, where the downlink transmission power adjustment is based on the one or more downlink messages at least partially overlapping in time with the one or more uplink messages, and transmitting the one or more downlink messages while simultaneously receiving the one or more uplink messages, where a downlink transmission power of at least one downlink message of the one or more downlink messages is based on the value of the downlink transmission power adjustment.

An apparatus for wireless communication at a base station is described. The apparatus may include a processor, memory coupled with the processor, and instructions stored in the memory. The instructions may be executable by the processor to cause the apparatus to determine that one or more downlink messages to be transmitted from the base station at least partially overlap in time with one or more uplink messages to be received from a UE based on the UE supporting full-duplex communications, configure a value of a downlink transmission power adjustment for the one or more downlink messages, where the downlink transmission power adjustment is based on the one or more downlink messages at least partially overlapping in time with the one or more uplink messages, and transmit the one or more downlink messages while simultaneously receiving the one or more uplink messages, where a downlink transmission power of at least one downlink message of the one or more downlink messages is based on the value of the downlink transmission power adjustment.

Another apparatus for wireless communication at a base station is described. The apparatus may include means for determining that one or more downlink messages to be transmitted from the base station at least partially overlap in time with one or more uplink messages to be received from a UE based on the UE supporting full-duplex communications, means for configuring a value of a downlink transmission power adjustment for the one or more downlink messages, where the downlink transmission power adjustment is based on the one or more downlink messages at least partially overlapping in time with the one or more uplink messages, and means for transmitting the one or more downlink messages while simultaneously receiving the one or more uplink messages, where a downlink transmission power of at least one downlink message of the one or more downlink messages is based on the value of the downlink transmission power adjustment.

A non-transitory computer-readable medium storing code for wireless communication at a base station is described. The code may include instructions executable by a processor to determine that one or more downlink messages to be transmitted from the base station at least partially overlap in time with one or more uplink messages to be received from a UE based on the UE supporting full-duplex communications, configure a value of a downlink transmission power adjustment for the one or more downlink messages, where the downlink transmission power adjustment is based on the one or more downlink messages at least partially overlapping in time with the one or more uplink messages, and transmit the one or more downlink messages while simultaneously receiving the one or more uplink messages, where a downlink transmission power of at least one downlink message of the one or more downlink messages is based on the value of the downlink transmission power adjustment.

Some examples of the method, apparatuses, and non-transitory computer-readable medium described herein may further include operations, features, means, or instructions for transmitting, to the UE, a control message indicating the value of the downlink transmission power adjustment, where the control message includes a bit field indicating the value of the downlink transmission power adjustment.

Some examples of the method, apparatuses, and non-transitory computer-readable medium described herein may further include operations, features, means, or instructions for selecting the value of the downlink transmission power adjustment from a set of two or more values of the downlink transmission power adjustment; where a configuration of the set of two or more values of the downlink transmission power adjustment may be indicated to the UE via RRC signaling.

In some examples of the method, apparatuses, and non-transitory computer-readable medium described herein, the control message includes DCI scheduling the one or more downlink messages.

Some examples of the method, apparatuses, and non-transitory computer-readable medium described herein may further include operations, features, means, or instructions for identifying one or more communications parameters including a downlink resource allocation, an uplink resource allocation, an MCS, one or more channel measurements, an RSRP, an RSSI, one or more self-interference measurements, or any combination thereof, where the value of the downlink transmission power adjustment may be based on the one or more communications parameters.

Some examples of the method, apparatuses, and non-transitory computer-readable medium described herein may further include operations, features, means, or instructions for transmitting, to the UE, RRC signaling configuring a rule for determining the value of the downlink transmission power adjustment, where the rule may be associated with one or more tables that indicate the value of the downlink transmission power adjustment.

Some examples of the method, apparatuses, and non-transitory computer-readable medium described herein may further include operations, features, means, or instructions for applying the value of the downlink transmission power adjustment to each downlink message of the one or more downlink messages, where the downlink transmission power may be based on applying the value of the downlink transmission power adjustment to each downlink message of the one or more downlink messages.

Some examples of the method, apparatuses, and non-transitory computer-readable medium described herein may further include operations, features, means, or instructions for applying the value of the downlink transmission power adjustment to one or more RBs, one or more symbols, or any combination thereof, corresponding to the one or more downlink messages that at least partially overlap with the one or more uplink messages, where the downlink transmission power may be based on applying the value of the downlink transmission power adjustment to each downlink message of the one or more downlink messages.

Some examples of the method, apparatuses, and non-transitory computer-readable medium described herein may further include operations, features, means, or instructions for applying the value of the downlink transmission power adjustment to one or more RBs of the one or more downlink messages based on a rule, the rule being associated with the one or more downlink messages and the one or more uplink messages satisfying a performance threshold, where the downlink transmission power may be based on applying the value of the downlink transmission power adjustment to each downlink message of the one or more downlink messages.

Some examples of the method, apparatuses, and non-transitory computer-readable medium described herein may further include operations, features, means, or instructions for determining an increase of the downlink transmission power based on the one or more downlink messages at least partially overlapping in time with the one or more uplink messages, where the value of the downlink transmission power adjustment indicates the increase to the downlink transmission power.

Some examples of the method, apparatuses, and non-transitory computer-readable medium described herein may further include operations, features, means, or instructions for determining a decrease of the downlink transmission power based on the one or more downlink messages at least partially overlapping in time with the one or more uplink messages, where the value of the downlink transmission power adjustment indicates the increase to the downlink transmission power.

Some examples of the method, apparatuses, and non-transitory computer-readable medium described herein may further include operations, features, means, or instructions for determining that the downlink transmission power may be to remain unchanged based on the one or more downlink messages at least partially overlapping in time with the one or more uplink messages, where the value of the downlink transmission power adjustment indicates that the downlink transmission power remains unchanged.

DETAILED DESCRIPTION

Figure 1:
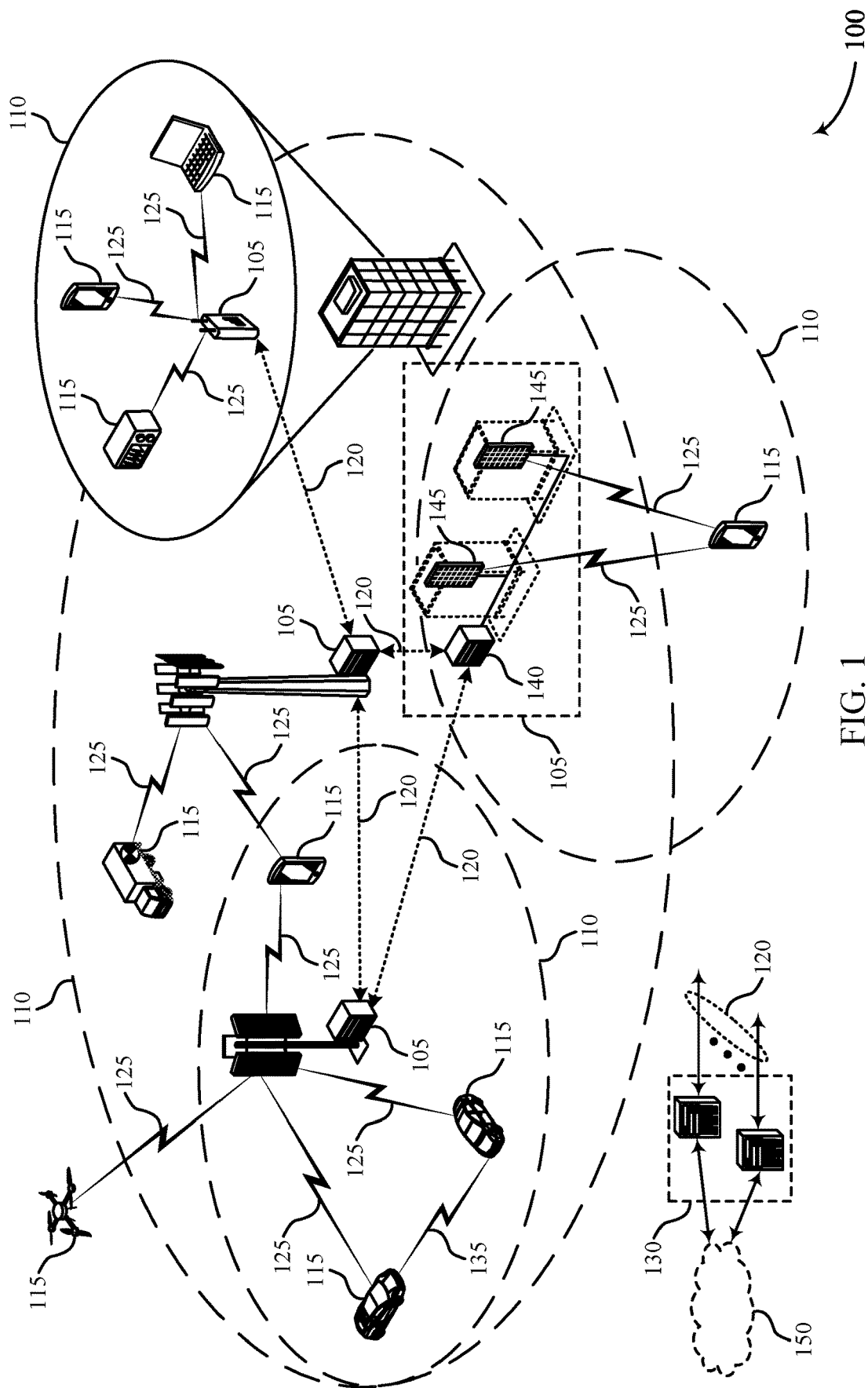
FIGS. 1 through 3 illustrate examples of wireless communications systems that support downlink power adaptation for full-duplex systems in accordance with aspects of the present disclosure.

Some wireless communications systems may support full-duplex communications between wireless devices (e.g., user equipment (UEs), base stations). For example, a UE may transmit an uplink message while simultaneously receiving a downlink message from a base station. In some cases, the UE, the base station, or both, may experience self-interference while performing full-duplex communications. For example, uplink signals generated at the UE may interfere with downlink signals arriving at the UE. As a result, the UE may be unable to successfully receive the downlink message from the base station. Likewise, if the base station transmits a downlink message while simultaneously receiving an uplink message from the UE, downlink signals generated at the base station may interfere with uplink signals arriving at the base station. Thus, self-interference may decrease the reliability and efficiency of full-duplex communications between the base station and the UE.

In some cases, the base station may employ various techniques to mitigate self-interference while performing full-duplex communications. For example, the base station may use different antenna panels to perform different full-duplex operations. That is, the base station may use a first antenna panel to perform uplink reception and may use a second antenna panel to perform downlink transmission. Alternatively or additionally, the base station may employ specialized hardware to reduce signal leakage between concurrent operations. However, such techniques may not be appropriate for full-duplex UEs, which may have size restrictions, power constraints, and limited processing capabilities.

In accordance with aspects of the present disclosure, the base station and the UE may mitigate self-interference associated with full-duplex communications based on adjusting a transmission power for one or more downlink messages that at least partially overlap in time with one or more uplink messages. For example, if a scheduled downlink message to be transmitted from the base station to a UE overlaps in time with a scheduled uplink message to be transmitted from the UE to the base station, the base station may adjust a transmission power of the downlink message such that self-interference at the UE, the base station, or both, is reduced. Increasing the transmission power of the downlink message may reduce self-interference at the UE, whereas decreasing the transmission power of the downlink message may reduce self-interference at the base station. Adjusting the transmission power of the downlink message may enable the base station and the UE may perform full-duplex communications with reduced self-interference, improved reliability, and greater efficiency, among other benefits.

In some examples, the base station and the UE may determine an adjusted downlink transmission power based on one or more communication parameters, which may include a downlink resource allocation, an uplink resource allocation, a modulation and coding scheme (MCS), a set of channel measurements, a reference signal received power (RSRP), a received signal strength indicator (RSSI), a self-interference measurement, or a combination thereof. In some examples, the base station may signal a downlink transmission power adjustment to the UE, for example, via radio resource control (RRC) signaling, a downlink control information (DCI) message, or both.

Additionally or alternatively, the UE may implicitly determine an adjusted downlink transmission power based on one or more rules. For example, the UE may implicitly determine an adjusted downlink transmission power based on one or more tables (e.g., time-domain resource allocation (TDRA) tables) configured via RRC signaling, a priority level associated with one or more downlink messages, a priority level associated with one or more uplink messages, downlink resource allocations, uplink resource allocations, or a combination thereof. In some examples, the base station may selectively adjust a transmission power for a portion of a downlink message (e.g., some resource blocks, symbols, or both) rather than adjusting the transmission power for the entire downlink message.

Aspects of the present disclosure may be implemented to realize one or more of the following advantages. The described techniques may provide for enhanced full-duplex communications between a UE and a base station. More specifically, the described techniques may enable a UE, a base station, or both, to perform full-duplex communications with relatively reduced self-interference based on adjusting a downlink transmission power at the base station. For example, the base station may decrease a downlink transmission power to reduce self-interference at the base station, thereby improving communications reliability and efficiency at the base station. Alternatively, the base station may increase a downlink transmission power to reduce self-interference at the UE, which may similarly provide for improved communications at the UE (e.g., relatively increasing the UEs ability to receive and decode downlink messages while simultaneously communicating on an uplink communication link). Adjusting the downlink transmission power may enable the UE, the base station, or both, to more effectively mitigate self-interference associated with performing full-duplex communications.

Aspects of the disclosure are initially described in the context of wireless communications systems. In addition, aspects of the disclosure are illustrated by and described with reference to process flows. Aspects of the disclosure are further illustrated by and described with reference to apparatus diagrams, system diagrams, and flowcharts that relate to downlink power adaptation for full-duplex systems.

FIG. 1 illustrates an example of a wireless communications system 100 that supports downlink power adaptation for full-duplex systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof. Wireless communications system 100 may support the use of modified transmission powers to reduce the effects of self-interference for full-duplex communications.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels.

The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 and a base station 105 may be configured for half-duplex communication (e.g., one-way communication at a time) or full-duplex communication (e.g., concurrent two-way communication) communication over a communication link 125. In some examples, the techniques described herein may apply to half-duplex system, full-duplex systems, or a combination thereof (e.g., systems that support half-duplex communications with some devices, while supporting full-duplex communications with one or more other devices). In a full-duplex system, the UE 115 or base station 105, or both, may cause self-interference by concurrently transmitting and receiving over a communication link 125. In some cases, a downlink transmission power may be modified to account for interference (e.g., self-interference) for wireless communications in the system.

In the wireless communications system 100, a UE 115 supporting full-duplex communications may be scheduled to receive a set of downlink messages from a base station 105. The UE 115 may also be scheduled to transmit a set of uplink messages. In some examples, the set of downlink messages may at least partially overlap in time with the set of uplink messages. In such examples, the UE 115 may determine an adjusted downlink transmission power for at least a subset of the downlink messages based on determining that the set of downlink messages overlaps in time with the set of uplink messages. In some cases, the downlink transmission power may be adjusted (or, in some examples, may remain the same as a previously-configured downlink transmission power) based on whether the scheduled uplink and downlink messages overlap. Accordingly, the UE 115 may transmit the set of uplink messages while simultaneously receiving the set of downlink messages with the adjusted downlink transmission power.

In some examples, the adjusted downlink transmission power may be based on one or more communication parameters, which may include a downlink resource allocation corresponding to the set of downlink messages, an uplink resource allocation corresponding to the set of uplink messages, an MCS, a set of channel measurements, an RSRP, an RSSI, a self-interference measurement, or a combination thereof. In some examples, the UE 115 may determine the adjusted downlink transmission power based on a DCI message, one or more tables (e.g., TDRA tables) configured via RRC signaling, a priority level associated with the set of downlink messages, a priority level associated with the set of uplink messages, a set of configured rules, or a combination thereof. Receiving the set of downlink messages with the adjusted downlink transmission power may enable the UE 115 to mitigate self-interference and perform full-duplex communications with improved reliability, among other benefits.

Figure 2:
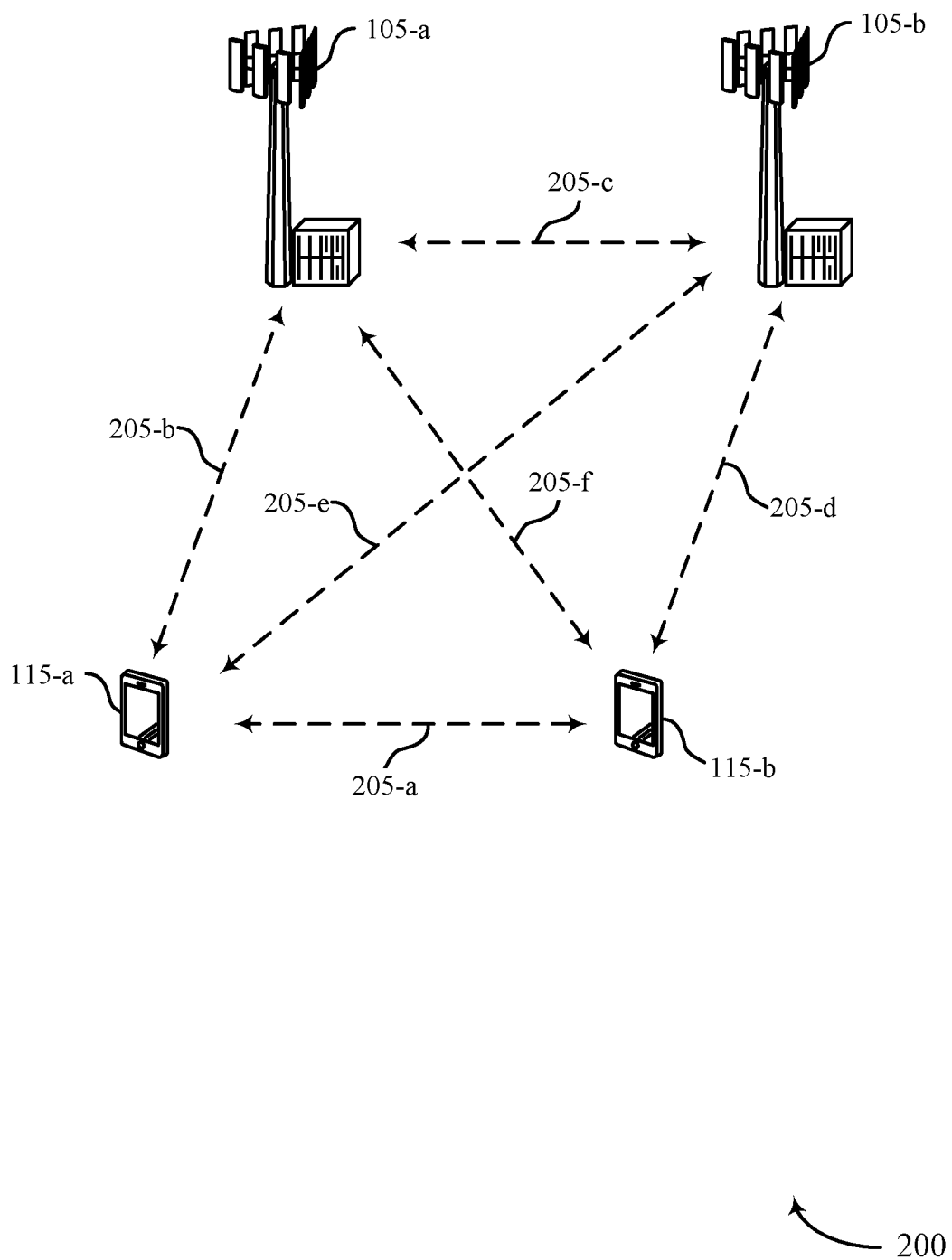

FIG. 2 illustrates an example of a wireless communications system 200 that supports downlink power adaptation for full-duplex systems in accordance with aspects of the present disclosure. In some examples, the wireless communications system 200 may implement aspects of the wireless communications system 100. For example, the wireless communications system 200 may include a UE 115-a, a UE 115-b, a base station 105-a, and a base station 105-b, which may be examples of corresponding devices described herein with reference to FIG. 1. In the wireless communications system 200, the base stations 105 and the UEs 115 may communicate over communication links 205, which may be examples of a communication link 125 described herein with reference to FIG. 1. The communication links 205 may include uplinks (e.g., uplink communication links), downlinks (e.g., downlink communication links), sidelinks (e.g., sidelink communication links), or a combination thereof. The wireless communications system 200 may support full-duplex communications between the UEs 115 and the base stations 105. In some examples, one or more of the UEs 115 and base stations 105 may experience self-interference while performing full-duplex communications. In accordance with techniques described herein, the base stations 105 may adjust a downlink transmission power to mitigate self-interference associated with performing full-duplex communications.

The wireless communications system 200 may include one or more wireless devices that support full-duplex communications and one or more wireless devices that support half-duplex communications. Half-duplex wireless devices may be capable of transmitting or receiving messages (but not both) at a specific time, whereas full-duplex wireless devices may be capable of simultaneously transmitting and receiving messages at a specific time. In some cases, the base stations 105 may be half-duplex wireless devices that are unable to perform full-duplex communications. For example, if the base stations 105 are multi-transmission and reception points (multi-TRPs), the base stations 105 may be configured to perform transmission or reception operations (but not both).

In some cases, the UEs 115 may be half-duplex wireless devices and the base stations 105 may be full-duplex wireless devices. In such cases, the UEs 115, the base stations 105, or both may experience interference while communicating with each other. For example, if the base station 105-b transmits a downlink message to the UE 115-a while the base station 105-a is attempting to receive an uplink message from the UE 115-b, the downlink message from the base station 105-b may reduce the likelihood of the base station 105-a successfully decoding the uplink message from the UE 115-b. That is, the base station 105-a may experience interference from the base station 105-b on the communication link 205-c. Similarly, if the UE 115-b transmits an uplink message to the base station 105-a while the UE 115-a is attempting to receive a downlink message from the base station 105-a, the uplink message from the UE 115-b may reduce the likelihood of the UE 115-a successfully decoding the downlink message from the base station 105-a. In other words, the UE 115-a may experience interference from the UE 115-b on the communication link 205-a. Such interference may reduce the reliability of communications between the base stations 105 and the UEs 115.

Additionally or alternatively, the full-duplex wireless devices (e.g., the base stations 105) may experience self-interference while performing full-duplex communications. For example, if the base station 105-a transmits a downlink message to the UE 115-a while simultaneously receiving an uplink message from the UE 115-a, the downlink message may interfere with the uplink message at the base station 105-a. As a result, the base station 105-a may be unable to successfully decode the uplink message from the UE 115-b. This self-interference may reduce the reliability of full-duplex communications.

In some other cases, both the UEs 115 and the base stations 105 may be capable of performing full-duplex communications. In such cases, the full-duplex UEs 115 may experience self-interference and interference from other wireless devices. For example, if the UE 115-a transmits an uplink message to the base station 105-a while simultaneously receiving a downlink message from the base station 105-a, the uplink message may interfere with the downlink message at the UE 115-*a*. As a result, the UE 115-*a* may receive the downlink message with reduced reliability. Additionally or alternatively, if the base station 105-*b* transmits a downlink message to the UE 115-*b* while the UE 115-*a* is performing full-duplex communications with the base station 105-*a*, the downlink message may interfere with the full-duplex communications at the UE 115-*a*. That is, the UE 115-*a* may experience interference from the base station 105-*b* on a communication link 205-*e*. Both types of interference may reduce the reliability of full-duplex communications at the UE 115-*a*.

In some cases, a wireless device may perform full-duplex communications with multiple different wireless devices. For example, the UE 115-*b* may receive a downlink message from the base station 105-*b* on a communication link 205-*d* while simultaneously transmitting a sidelink message to the UE 115-*b* on a communication link 205-*a*. Likewise, the base station 105-*a* may transmit a message to the base station 105-*b* on a communication link 205-*c* while receiving an uplink message from the UE 115-*b* on a communication link 205-*f*.

To mitigate self-interference and attain improved isolation (e.g., greater than 50 decibels (dBs)) between concurrent operations (e.g., uplink and downlink, transmission and reception), a wireless device may use two separate antenna panels to perform different operations at the same time. For example, the base station 105-*a* may use a first antenna panel for downlink transmission and a second antenna panel for uplink reception. Using separate panels may reduce the likelihood of signals generated at the first antenna panel (e.g., downlink messages) interfering with signals arriving at the second antenna panel (e.g., uplink messages). In some cases, to further reduce self-interference, a wireless device may perform a first operation (e.g., downlink transmission) at both edges of a frequency band and may perform a second operation (e.g., uplink reception) in the middle of the frequency band. That is, the wireless device may transmit and receive at the same time but on different frequency resources. In other words, downlink resources and uplink resources used by the wireless device may be separated in the frequency-domain. Using different portions of the frequency band for uplink and downlink operations may be equivalently referred to as sub-band FDD or flexible duplexing. Employing a sub-band FDD communication scheme may, for example, provide more than 40 dBs of isolation between uplink and downlink operations at the wireless device. Alternatively, the wireless device may use an in-band full-duplex (IBFD) communication scheme, in which the wireless device performs transmission and reception operations at the same time and on the same frequency resources. That is, the wireless device may use the same IBFD time and frequency resources to perform uplink and downlink operations. In some cases, these time and frequency resources may fully or partially overlap in the time-domain, the frequency-domain, or both.

A wireless device performing full-duplex communications in accordance with a sub-band FDD communication scheme may refrain from transmitting or receiving messages in a guard band between different portions of a frequency band designated for different operations (e.g., uplink and downlink, transmission and reception). Using a guard band may increase isolation between such operations at the wireless device. For example, using a guard band may increase isolation between simultaneous downlink transmission and uplink reception operations at the base station 105-*b*. Additionally or alternatively, a wireless device supporting full-duplex communications may use weighted overlap and add (WOLA) techniques to reduce an adjacent channel leakage ratio (ACLR) between uplink and downlink signals at the wireless device. In some cases, the wireless device may also employ an analog low-pass filter (LPF) to improve the dynamic range of an analog digital converter (ADC) used for full-duplex communications. The wireless device may further reduce self-interference associated with performing full-duplex communications based on using improved reception automatic gain control (AGC) states to improve a noise figure (NF) of full-duplex communications. Similarly, the wireless device may improve isolation between concurrent full-duplex operations by more than 20 dBs based on using a digital integrated circuit (IC) configured with a non-linear model for each transmission and reception pair (e.g., to reduce ACLR leakage).

In some cases, however, such techniques for self-interference mitigation may be associated with prohibitive power consumption, excessive processing overhead, or both. As a result, these techniques may not be appropriate for full-duplex UEs 115 that have power constraints and limited processing capabilities. Moreover, full-duplex UEs 115 may have size restrictions that make some techniques (e.g., using spatially-separated antenna panels) relatively less effective.

In accordance with aspects of the present disclosure, the base stations 105 may adjust (e.g., regulate, adapt) a transmission power for downlink operations that overlap in time with uplink operations such that the base stations 105 and the UEs 115 may perform full-duplex communications with relatively reduced self-interference and improved reliability (e.g., compared to other schemes that may not adapt downlink transmission power as a function of uplink transmissions), among other benefits. For example, if a scheduled downlink message from the base station 105-*a* to the UE 115-*a* overlaps in time with a scheduled uplink message from the UE 115-*a* to the base station 105-*a*, the base station 105-*a* may adapt a transmission power for the scheduled downlink message such that the base station 105-*a*, the UE 115-*a*, or both experience reduced self-interference. If the UE 115-*a* is experiencing self-interference, the base station 105-*a* may increase the transmission power for the scheduled downlink message. Alternatively, if the base station 105-*a* is experiencing self-interference, the base station 105-*a* may decrease the transmission power for the scheduled downlink message.

The base stations 105 (e.g., the network) may determine to increase, decrease, or maintain the transmission power for a scheduled downlink message based on a set of communication parameters. For example, the base station 105-*a* may determine an adjusted transmission power for a scheduled downlink message to the UE 115-*a* based on a downlink resource allocation corresponding to the scheduled downlink message, an uplink resource allocation corresponding to a scheduled uplink message that overlaps in time with the scheduled downlink message, an MCS, a set of channel measurements corresponding to the communication link 205-*b* between the base station 105-*a* and the UE 115-*a*, an RSRP, an RSSI, a set of self-interference measurements (e.g., associated with the base station 105-*a*, the UE 115-*a*, or both), or a combination thereof. In some examples, the base station 105-*a* may determine the adjusted transmission power for the scheduled downlink message according to a specific rule, which the UE 115-*a* may use to implicitly determine the adjusted transmission power. For example, the UE 115-*a* may implicitly determine the adjusted transmission power based on a priority level associated with the scheduled downlink message, a priority level associated with a scheduled uplink message that overlaps in time with the scheduled downlink message, an uplink resource allocation, a downlink resource allocation, a time overlap between the scheduled uplink message and the scheduled downlink message, an MCS, a rank associated with the scheduled downlink message, a rank associated with the scheduled uplink message, or a combination thereof.

In some examples, the base stations 105 may selectively adjust the transmission power for a portion of a scheduled downlink message. For example, the base station 105-a may increment or decrement the transmission power for one or more RBs or symbols in a scheduled downlink message that overlaps with a scheduled uplink message. In some other examples, the base station 105-a may select specific RBs in the scheduled downlink message according to a specific rule and may adapt the transmission power for the selected RBs to optimize both the scheduled downlink message and the scheduled uplink message. Additionally or alternatively, the base station 105-a may adjust the transmission power for the entire scheduled downlink message.

In some examples, the base stations 105 may indicate an adjusted transmission power of a scheduled downlink message to the UEs 115 via a message (e.g., a scheduling DCI message). For example, the base station 105-a may transmit a scheduling DCI message to the UE 115-a, where two bits in the scheduling DCI message (e.g., a DCI that schedules one or more uplink or downlink transmissions) may represent four different transmission power candidates for the scheduled downlink message. The UE 115-a may determine the adjusted transmission power for the scheduled downlink message based on these bits. In some examples, the base stations 105 may configure the UEs 115 with different downlink transmission power candidates during an RRC configuration period, and may subsequently indicate one of the configured candidates via dynamic signaling (e.g., a DCI message).

Adjusting a transmission power of a scheduled downlink message may enable the UEs 115 to perform full-duplex communications with the base stations 105 (and other wireless devices in the wireless communications system 200) with reduced self-interference and improved reliability. Moreover, adapting downlink transmission power may enable the UEs 115 to mitigate self-interference without prohibitive power consumption or excessive processing overhead.

Figure 3:
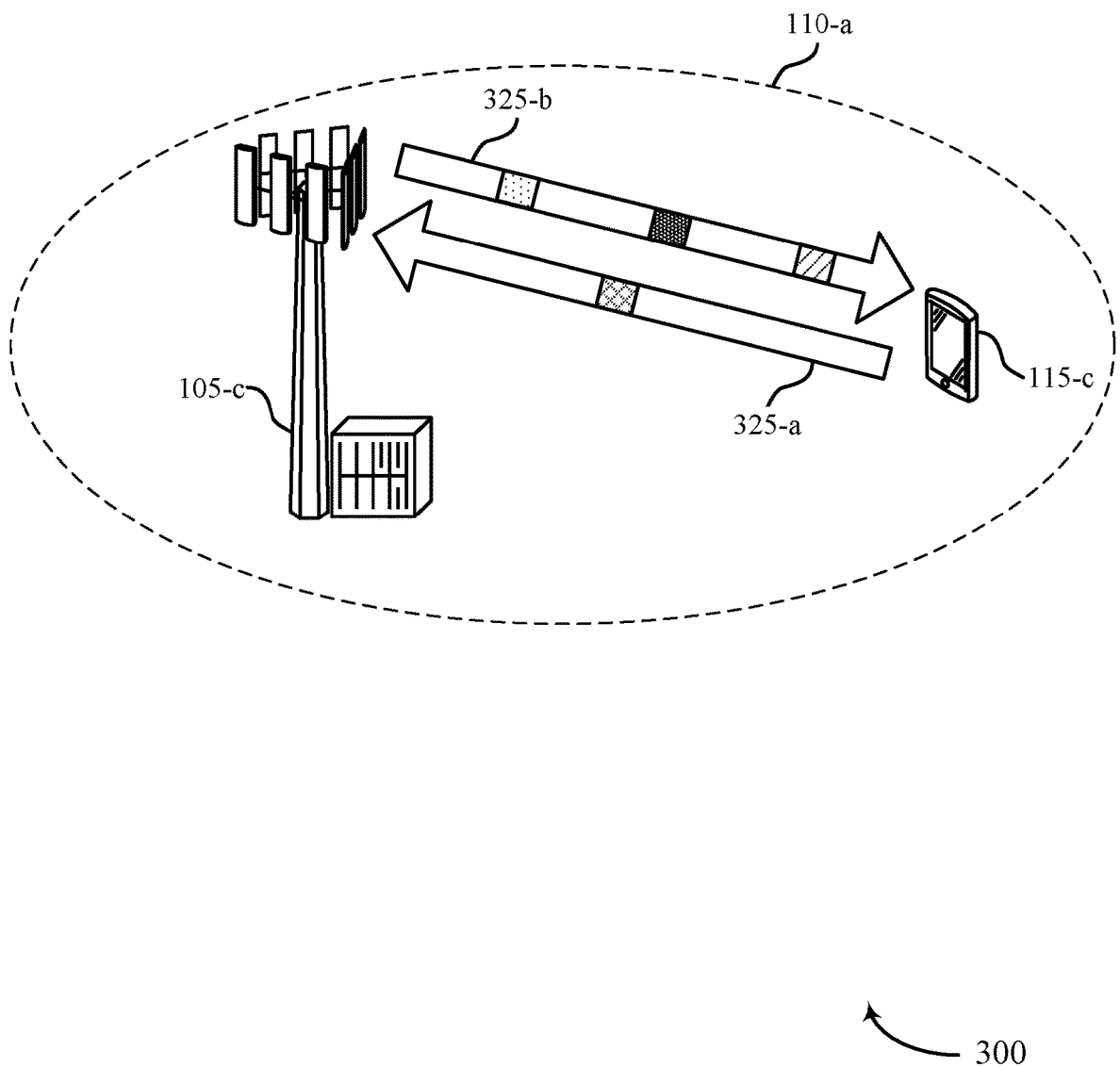

FIG. 3 illustrates an example of a wireless communications system 300 that supports downlink power adaptation for full-duplex systems in accordance with aspects of the present disclosure. In some examples, the wireless communications system 300 may implement aspects of the wireless communications system 100 and the wireless communications system 200. For example, the wireless communications system 300 may include a UE 115-c and a base station 105-c, which may be examples of corresponding devices described herein with reference to FIGS. 1 and 2. In the wireless communications system 300, the base station 105-c and the UE 115-c may communicate over a communication link 325-a (e.g., an uplink) and a communication link 325-b (e.g., a downlink), which may be examples of a communication link 125 or a communication link 205 described herein with reference to FIGS. 1 and 2, respectively. The base station 105-c and the UE 115-c may communicate within a geographic coverage area 110-a of the base station 105-c, which may be an example of a geographic coverage area 110 as described herein with reference to FIG. 1. The wireless communications system 300 may support full-duplex communications between the UE 115-c and the base station 105-c. In some examples, the UE 115-c, the base station 105-c, or both may experience self-interference while performing full-duplex communications. In accordance with techniques described herein, the base station 105-c may adjust a transmission power for one or more downlink messages 315 to mitigate self-interference associated with performing full-duplex communications.

In the wireless communications system 300, the base station 105-c may perform full-duplex communications with the UE 115-c. For example, the base station 105-c may schedule one or more downlink messages 315 to the UE 115-c that overlap in time with one or more scheduled uplink messages 320 from the UE 115-c to the base station 105-c. In such examples, the base station 105-c may adapt a transmission power for the downlink messages 315 to reduce self-interference at the base station 105-c, the UE 115-c, or both. If the UE 115-c is experiencing self-interference, the base station 105-c may increase the transmission power for the downlink messages 315. Alternatively, if the base station 105-c is experiencing self-interference, the base station 105-c may decrease the transmission power for the downlink messages 315.

The base station 105-c may determine to modify (e.g., increase, decrease) or maintain the transmission power (e.g., relative to a transmission power configuration previously used by the base station 105-c) for the downlink messages 315 based on a set of communication parameters. For example, the base station 105-c may determine an adjusted transmission power for the downlink messages 315 based on a downlink resource allocation corresponding to the downlink messages 315, an uplink resource allocation corresponding to the uplink messages 320, an MCS, a set of channel measurements corresponding to the communication links 325-a and 325-b, an RSRP, an RSSI, a set of self-interference measurements associated with the base station 105-c, a set of self-interference measurements associated with the UE 115-c, or a combination thereof. Additionally or alternatively, the base station 105-c may determine the adjusted transmission power for the downlink messages 315 according to some rule, which the UE 115-c may use to implicitly determine the adjusted transmission power. For example, the UE 115-c may implicitly determine the adjusted transmission power based on a priority level associated with the downlink messages 315, a priority level associated with the uplink messages 320 (e.g., a priority relative to one or more other messages or transmissions), a downlink resource allocation corresponding to the downlink messages 315, an uplink resource allocation corresponding to the uplink messages 320, a time overlap between the downlink messages 315 and the uplink messages 320, an MCS, a rank associated with the downlink messages 315, a rank associated with the uplink messages 320, or a combination thereof.

In some examples, the base station 105-c may selectively adjust the transmission power for a portion of the downlink messages 315. For example, the base station 105-c may increment or decrement the transmission power for a set of RBs or symbols in the downlink messages 315 that overlap with a corresponding set of RBs or symbols in the uplink messages 320. In some other examples, the base station 105-c may select specific RBs in the downlink messages 315 according to a specific rule and may adapt the transmission power for the selected RBs so as to optimize both the downlink messages 315 and the uplink messages 320. Alternatively, the base station 105-c may apply the adjusted downlink transmission power to all of the downlink messages 315.

In some examples, the base station 105-c may transmit, to the UE 115-c, a DCI message 310 scheduling the downlink messages 315. The DCI message 310 may also indicate an adjusted transmission power for the downlink messages 315. For example, a bit field in the DCI message 310 may indicate different transmission power candidates for the downlink messages 315. Accordingly, the UE 115-c may determine the adjusted transmission power based on this bit field. In some examples, the base station 105-c may configure the UE 115-c with different downlink transmission power candidates via RRC signaling 305, and may indicate one of the configured candidates via dynamic signaling (e.g., via the DCI message 310). In some examples, the RRC signaling 305 may configure the UE 115-c with one or more tables (e.g., TDRA tables). The one or more tables may include multiple entries, each of which may indicate a specific downlink transmission power candidate for the downlink messages 315. Accordingly, the base station 105-c may indicate a specific entry of the one or more tables via the DCI message 310 and the UE 115-c may determine the adjusted downlink transmission power based on the indicated entry.

Adjusting the transmission power of the downlink messages 315 may enable the UE 115-c to perform full-duplex communications with the base station 105-c (and other wireless devices in the wireless communications system 300) with reduced self-interference and improved reliability. Moreover, adjusting the transmission power of the downlink messages 315 may enable the UE 115-c to mitigate self-interference without prohibitive power consumption and excessive processing overhead. In one example, the base station 105-c may mitigate or relatively reduce self-interference effects, or both, through the dynamic adjustment of the downlink transmission power of the downlink message 315, for example, using signaling or a rule (e.g., because the downlink message 315 may be transmitted with a relatively reduced transmission power, one or more simultaneous uplink messages 320 (e.g., uplink messages 320 that are simultaneous to one or more downlink messages 315) may be received and decoded with greater efficiency). Similarly, when the downlink transmission power is relatively increased, the UE 115-c may perform full-duplex communications with improved reliability because an uplink message 320 from the UE 115-c may be relatively less disruptive to receiving and decoding of the downlink message 315, thereby providing for enhanced throughput and reliability for wireless communications.

Figure 4:
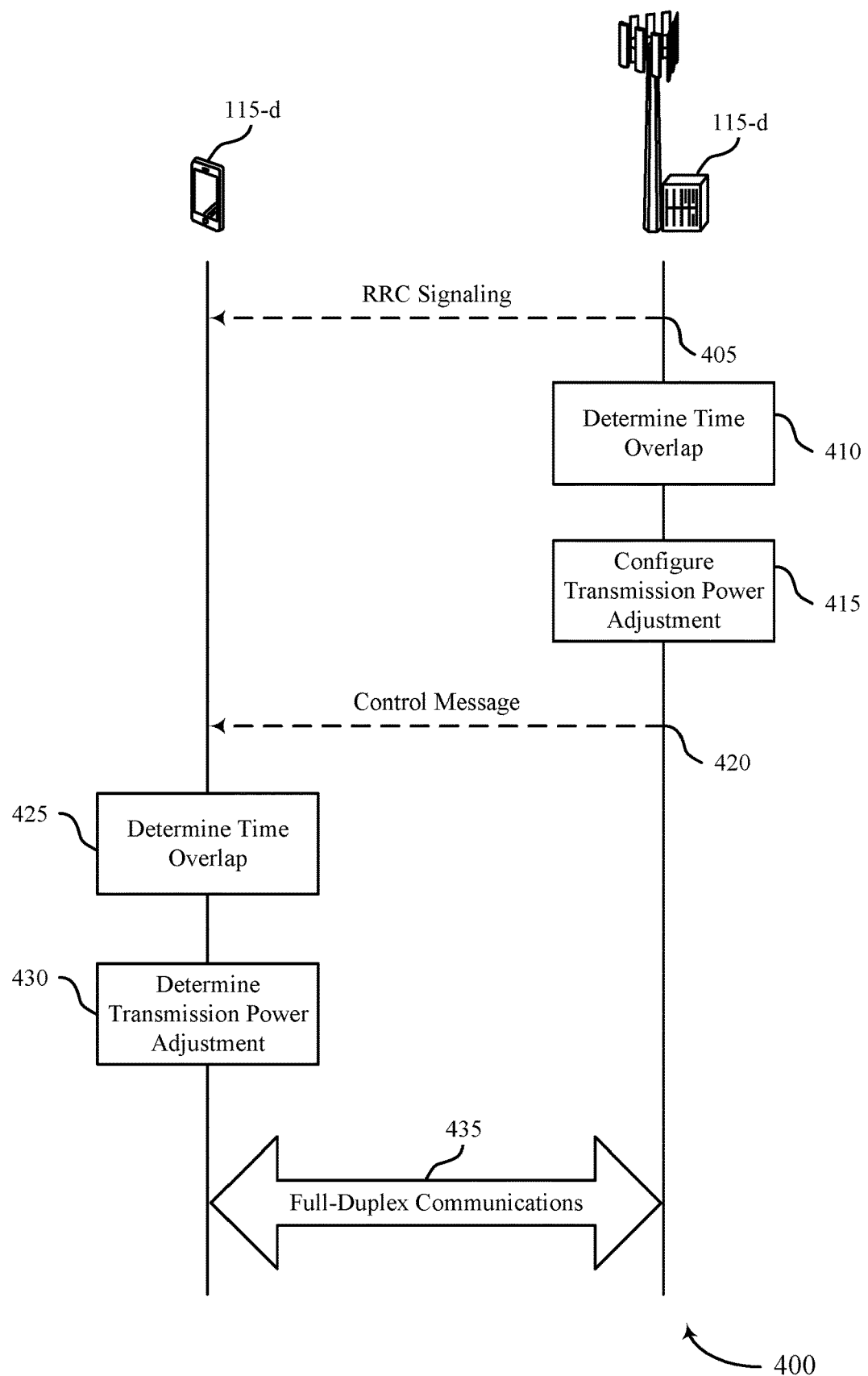
FIG. 4 illustrates an example of a process flow in a system that supports downlink power adaptation for full-duplex systems in accordance with aspects of the present disclosure.

FIG. 4 illustrates an example of a process flow 400 in a system that supports downlink power adaptation for full-duplex systems in accordance with aspects of the present disclosure. In some examples, the process flow 400 may implement or be implemented by aspects of the wireless communications system 100 and the wireless communications system 200. For example, the process flow 400 may illustrate communications between a base station 105-d and a UE 115-d, which may be examples of corresponding devices described herein with reference to FIGS. 1 and 2. In the following description of the process flow 400, operations between the base station 105-d and the UE 115-d may be performed in a different order or at a different time than as shown. Some operations may also be omitted from the process flow 400, and other operations may be added to the process flow 400. In some examples, the base station 105-d and the UE 115-d may communicate (e.g., using full-duplex communications, half-duplex communications, or both) with one or more other devices (not shown), such as described with reference to FIG. 2.

In the process flow 400, the UE 115-d and the base station 105-d may support full-duplex communications. That is, the UE 115-d and the base station 105-d may be capable of simultaneously transmitting and receiving messages to each other (or other wireless devices). For example, a set of downlink messages to be transmitted from the base station 105-d to the UE 115-d may overlap in time with a set of uplink messages to be transmitted from the UE 115-d to the base station 105-d. In some examples, the base station 105-d may transmit RRC signaling to the UE 115-d at 405. The RRC signaling may configure the UE 115-d with a set of downlink transmission power adjustment values via one or more tables (e.g., TDRA tables). The RRC signaling may also configure the UE 115-d with a set of rules for determining an adjusted downlink transmission power from the one or more tables. At 410, the base station 105-d may determine a time overlap between the set of downlink messages and the set of uplink messages.

At 415, the base station 105-d may configure an adjusted downlink transmission power for the set of downlink messages based on identifying a time overlap between the set of downlink messages and the set of uplink messages. In some examples, the base station 105-d may transmit a control message (e.g., a DCI message) to the UE 115-d at 420. The control message may schedule the set of downlink messages. The control message may also indicate an adjusted downlink transmission power for the set of downlink messages. At 425, the UE 115-d may determine a time overlap between the set of downlink messages and the set of uplink messages. In some examples, the UE 115-d may determine the time overlap between the set of downlink messages and the set of uplink messages based on receiving the control message from the base station 105-d.

At 430, the UE 115-d may determine the adjusted downlink transmission power for the set of downlink messages. In some examples, the UE 115-d may determine the adjusted downlink transmission power based on receiving the control message from the base station 105-d at 420. For example, the UE 115-d may identify, within the control message, a bit field indicating the adjusted downlink transmission power. In some examples, if the base station 105-d configures the UE 115-d with a set of downlink transmission power adjustment values via RRC signaling, the control message may indicate one of the RRC-configured downlink transmission power adjustment values. Additionally or alternatively, the UE 115-d may determine the adjusted downlink transmission power based on the set of downlink messages and the set of uplink messages satisfying a performance threshold. In some examples, the UE 115-d may determine that the adjusted downlink transmission power is to be applied to a subset of the downlink messages. For example, the UE 115-d may determine that the adjusted downlink transmission power is to be applied to one or more RBs, one or more symbols, or a combination thereof in which the set of downlink messages are to be transmitted.

In some examples, the UE 115-d may determine the adjusted downlink transmission power based on identifying one or more communication parameters. The one or more communication parameters may include a downlink resource allocation, an uplink resource allocation, an MCS, one or more channel measurements, an RSRP, an RSSI, one or more self-interference measurements, or a combination thereof. The UE 115-d may identify the one or more communication parameters based on a time overlap between the set of downlink messages and the set of uplink messages, a priority level associated with the set of downlink messages, a priority level associated with the set of uplink messages, an MCS associated with the set of uplink messages, an MCS associated with the set of downlink messages, a rank associated with the set of downlink messages, a rank associated with the set of uplink messages, or a combination thereof.

At 435, the UE 115-*d* perform full-duplex communications with the base station 105-*d*. For example, the UE 115-*d* may transmit the set of uplink messages to the base station 105-*d* while simultaneously receiving the set of downlink messages from the base station 105-*d*. Although the full-duplex communications are illustrated between the UE 115-*d* and the base station 105-*d*, it is to be understood that the full-duplex communications may also involve other wireless devices. For example, the UE 115-*d* may transmit the set of uplink messages to a different wireless device while receiving the set of downlink messages from the base station 105-*d*. Likewise, the base station may transmit the set of downlink messages to a different wireless device while receiving the set of uplink messages from the UE 115-*d*.

As a part of the full-duplex communications, the UE 115-*d* may receive the set of downlink messages with the adjusted downlink transmission power. More specifically, the UE 115-*d* may receive some of the downlink messages with an increased downlink transmission power, a decreased downlink transmission power, an unchanged downlink transmission power, or a combination thereof based on the determined downlink transmission power adjustment. Adjusting the downlink transmission power for the set of downlink messages may reduce self-interference at the UE 115-*d*, the base station 105-*d*, or both. For example, increasing the downlink transmission power may reduce self-interference at the UE 115-*d*, whereas decreasing the downlink transmission power may reduce self-interference at the base station 105-*d*.

Figure 5:
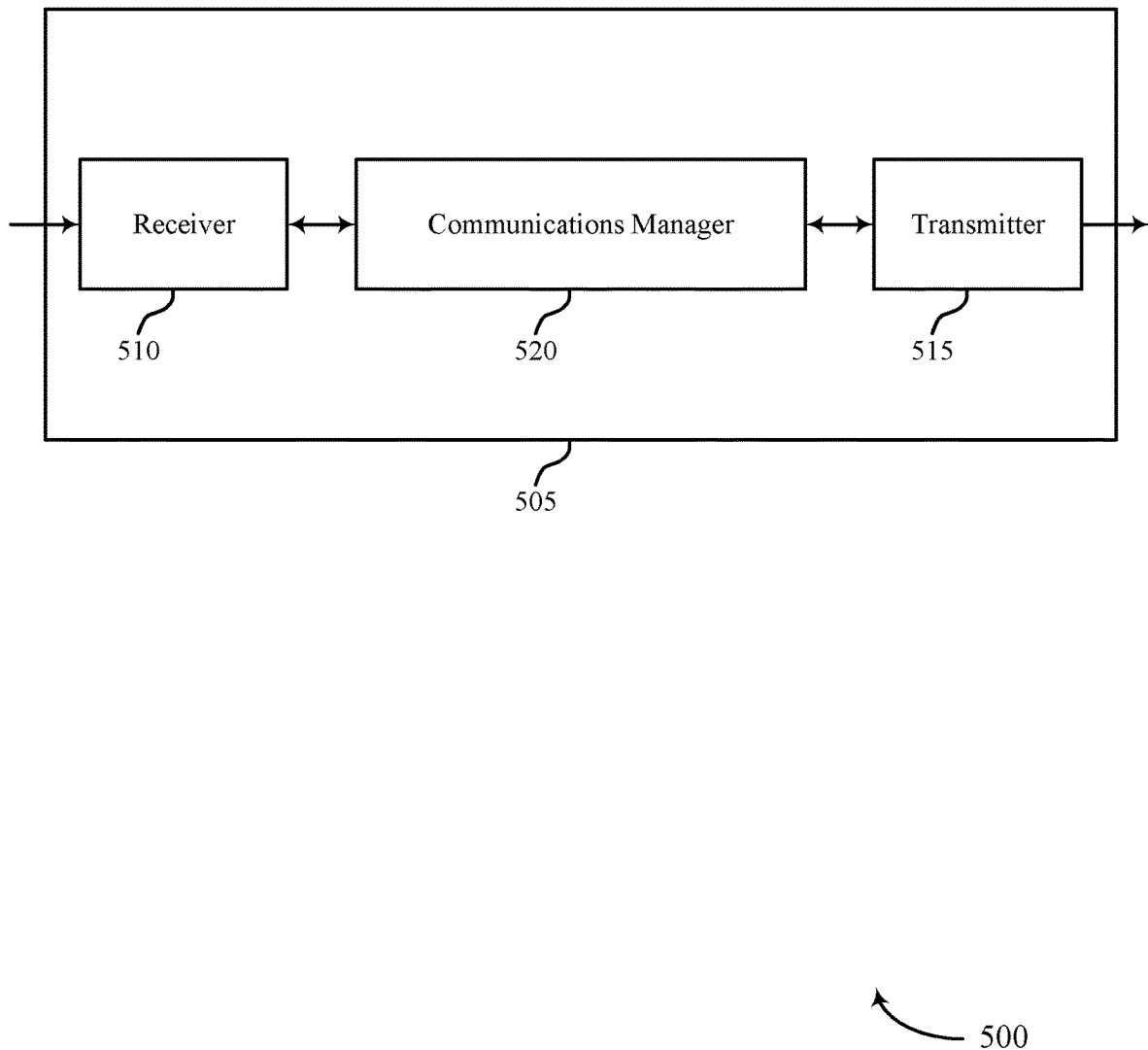
FIGS. 5 and 6 show block diagrams of devices that support downlink power adaptation for full-duplex systems in accordance with aspects of the present disclosure.

FIG. 5 shows a block diagram 500 of a device 505 that supports downlink power adaptation for full-duplex systems in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to downlink power adaptation for full-duplex systems). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to downlink power adaptation for full-duplex systems). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of downlink power adaptation for full-duplex systems as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for determining that one or more downlink messages to be received from a base station at least partially overlap in time with one or more uplink messages to be transmitted by the UE based on the UE supporting full-duplex communications. The communications manager 520 may be configured as or otherwise support a means for determining a value of a downlink transmission power adjustment for the one or more downlink messages, where the downlink transmission power adjustment is based on the one or more downlink messages at least partially overlapping in time with the one or more uplink messages. The communications manager 520 may be configured as or otherwise support a means for receiving the one or more downlink messages while simultaneously transmitting the one or more uplink messages, where a downlink transmission power of at least one downlink message of the one or more downlink messages is based on the value of the downlink transmission power adjustment.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing and reduced power consumption at the device 505. For example, the techniques described herein may enable the device 505 to perform full-duplex communications with higher reliability based on adjusting a downlink transmission power of the full-duplex communications. As a result, the device 505 may request fewer retransmissions and may spend more time in sleep mode, thereby reducing battery consumption at the device 505.

Figure 6:
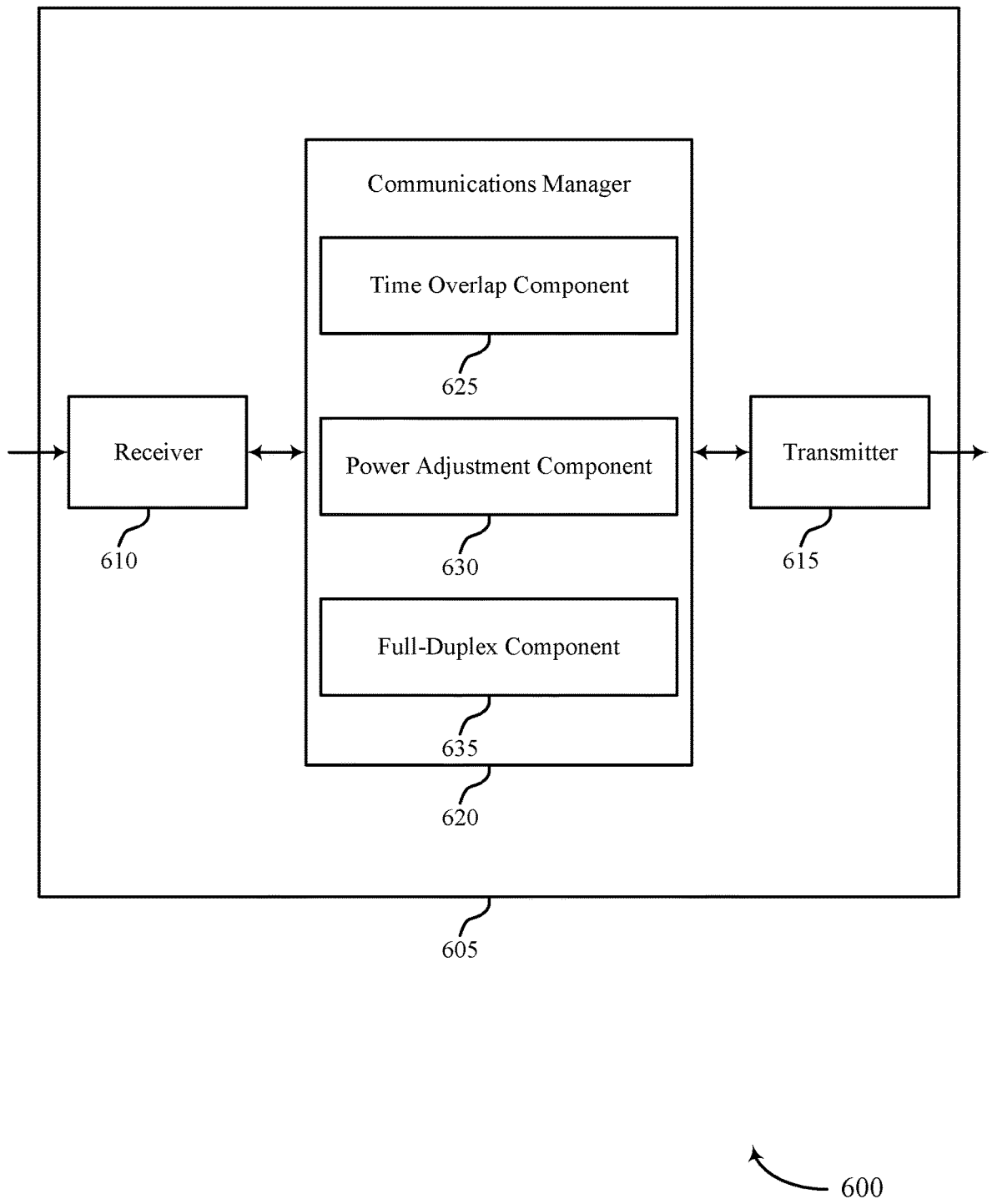

FIG. 6 shows a block diagram 600 of a device 605 that supports downlink power adaptation for full-duplex systems in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to downlink power adaptation for full-duplex systems). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to downlink power adaptation for full-duplex systems). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of downlink power adaptation for full-duplex systems as described herein. For example, the communications manager 620 may include a time overlap component 625, a power adjustment component 630, a full-duplex component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The time overlap component 625 may be configured as or otherwise support a means for determining that one or more downlink messages to be received from a base station at least partially overlap in time with one or more uplink messages to be transmitted by the UE based on the UE supporting full-duplex communications. The power adjustment component 630 may be configured as or otherwise support a means for determining a value of a downlink transmission power adjustment for the one or more downlink messages, where the downlink transmission power adjustment is based on the one or more downlink messages at least partially overlapping in time with the one or more uplink messages. The full-duplex component 635 may be configured as or otherwise support a means for receiving the one or more downlink messages while simultaneously transmitting the one or more uplink messages, where a downlink transmission power of at least one downlink message of the one or more downlink messages is based on the value of the downlink transmission power adjustment.

Figure 7:
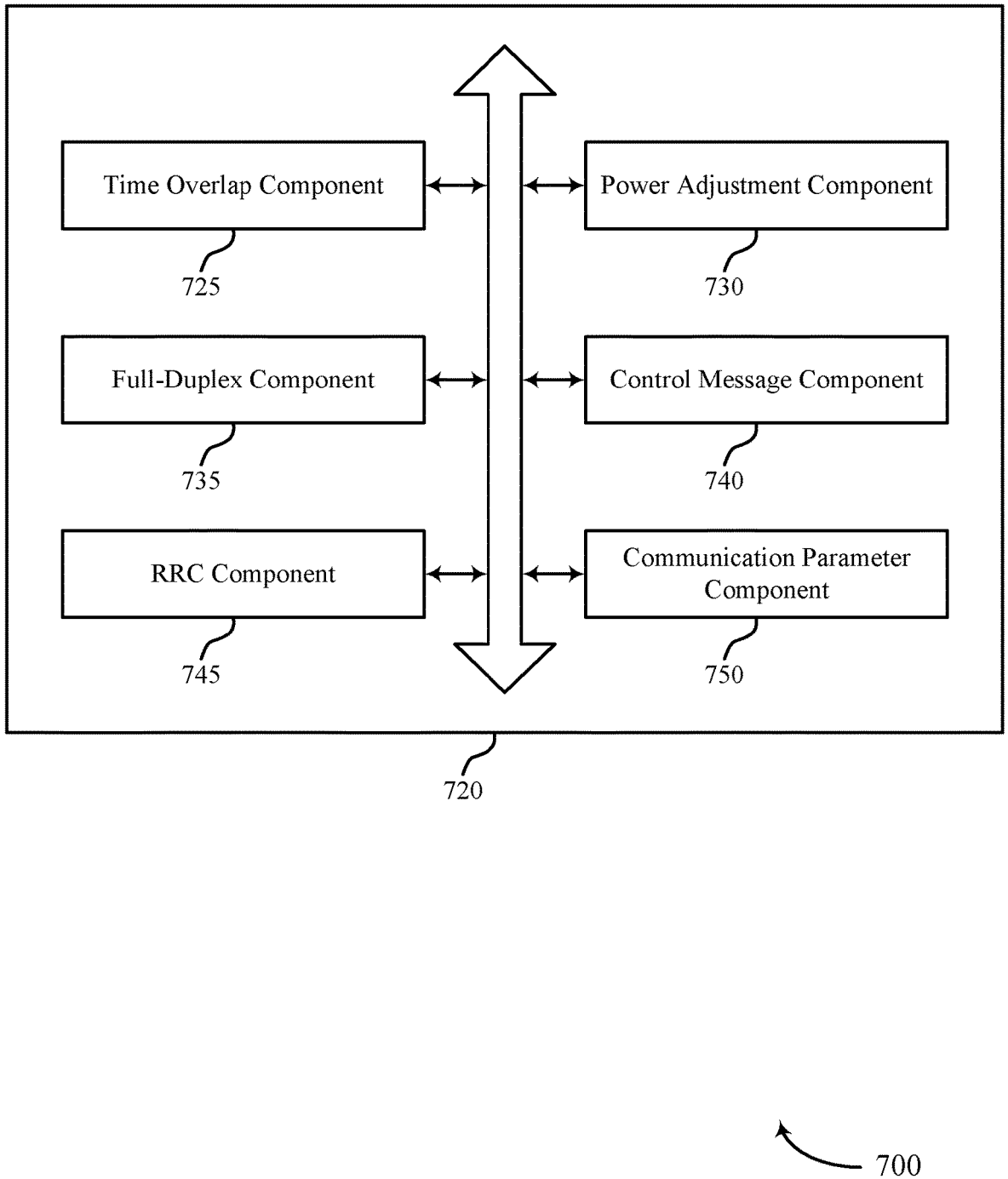
FIG. 7 shows a block diagram of a communications manager that supports downlink power adaptation for full-duplex systems in accordance with aspects of the present disclosure.

FIG. 7 shows a block diagram 700 of a communications manager 720 that supports downlink power adaptation for full-duplex systems in accordance with aspects of the present disclosure. The communications manager 720 may be an example of aspects of a communications manager 520, a communications manager 620, or both, as described herein. The communications manager 720, or various components thereof, may be an example of means for performing various aspects of downlink power adaptation for full-duplex systems as described herein. For example, the communications manager 720 may include a time overlap component 725, a power adjustment component 730, a full-duplex component 735, a control message component 740, an RRC component 745, a communication parameter component 750, or any combination thereof. Each of these components may communicate, directly or indirectly, with one another (e.g., via one or more buses).

The communications manager 720 may support wireless communication at a UE in accordance with examples as disclosed herein. The time overlap component 725 may be configured as or otherwise support a means for determining that one or more downlink messages to be received from a base station at least partially overlap in time with one or more uplink messages to be transmitted by the UE based on the UE supporting full-duplex communications. The power adjustment component 730 may be configured as or otherwise support a means for determining a value of a downlink transmission power adjustment for the one or more downlink messages, where the downlink transmission power adjustment is based on the one or more downlink messages at least partially overlapping in time with the one or more uplink messages. The full-duplex component 735 may be configured as or otherwise support a means for receiving the one or more downlink messages while simultaneously transmitting the one or more uplink messages, where a downlink transmission power of at least one downlink message of the one or more downlink messages is based on the value of the downlink transmission power adjustment.

In some examples, to support determining the value of the downlink transmission power adjustment, the control message component 740 may be configured as or otherwise support a means for receiving, from the base station, a control message indicating the value of the downlink transmission power adjustment, where the value of the downlink transmission power adjustment is determined based on receiving the control message.

In some examples, the control message component 740 may be configured as or otherwise support a means for identifying, within the control message, a bit field indicating the value of the downlink transmission power adjustment, where the value of the downlink transmission power adjustment is from a set of two or more values of the downlink transmission power adjustment that are configured via RRC signaling.

In some examples, the control message includes DCI scheduling the one or more downlink messages from the base station.

In some examples, the value of the downlink transmission power adjustment is based on one or more communications parameters including a downlink resource allocation, an uplink resource allocation, an MCS, one or more channel measurements, an RSRP, an RSSI, one or more self-interference measurements, or any combination thereof.

In some examples, to support determining the value of the downlink transmission power adjustment, the power adjustment component 730 may be configured as or otherwise support a means for determining the value of the downlink transmission power adjustment based on a rule associated with one or more communications parameters.

In some examples, the RRC component 745 may be configured as or otherwise support a means for receiving RRC signaling configuring the rule. In some examples, the power adjustment component 730 may be configured as or otherwise support a means for determining the rule based on receiving the RRC signaling.

In some examples, the rule is associated with one or more tables that indicate the value of the downlink transmission power adjustment.

In some examples, the communication parameter component 750 may be configured as or otherwise support a means for identifying the one or more communications parameters based on the one or more downlink messages at least partially overlapping in time with the one or more uplink messages, the one or more communications parameters including a priority of the one or more uplink messages, a priority of the one or more downlink messages, a downlink resource allocation, an uplink resource allocation, an overlap between the one or more downlink messages and the one or more uplink messages, an MCS associated with the one or more downlink messages, an MCS associated with the one or more uplink messages, a rank associated with the one or more downlink messages, a rank associated with the one or more uplink messages, one or more channel measurements, an RSRP, an RSSI, one or more self-interference measurements, or any combination thereof.

In some examples, the power adjustment component 730 may be configured as or otherwise support a means for determining that the value of the downlink transmission power adjustment is applied to each downlink message of the one or more downlink messages.

In some examples, the power adjustment component 730 may be configured as or otherwise support a means for determining that the value of the downlink transmission power adjustment is applied to one or more resource blocks, one or more symbols, or any combination thereof, corresponding to the one or more downlink messages that at least partially overlap with the one or more uplink messages.

In some examples, the power adjustment component 730 may be configured as or otherwise support a means for determining that the value of the downlink transmission power adjustment is applied to one or more resource blocks of the one or more downlink messages based on a rule, the rule being associated with the one or more downlink messages and the one or more uplink messages satisfying a performance threshold.

In some examples, the power adjustment component 730 may be configured as or otherwise support a means for identifying an increase in the downlink transmission power based on the value of the downlink transmission power adjustment.

In some examples, the power adjustment component 730 may be configured as or otherwise support a means for identifying a decrease in the downlink transmission power based on the value of the downlink transmission power adjustment.

In some examples, the power adjustment component 730 may be configured as or otherwise support a means for determining that the downlink transmission power is unchanged based on the value of the downlink transmission power adjustment.

Figure 8:
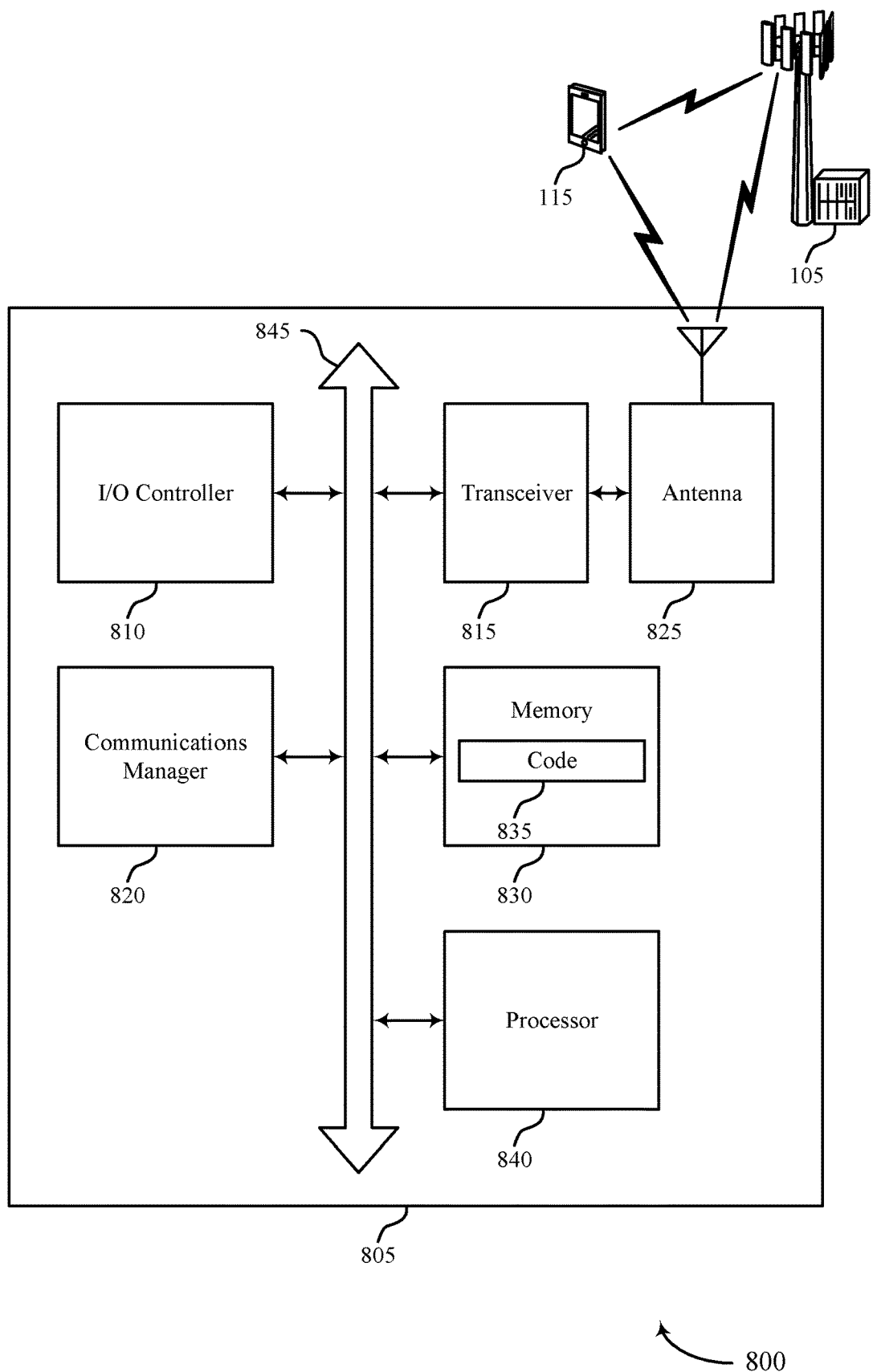
FIG. 8 shows a diagram of a system including a device that supports downlink power adaptation for full-duplex systems in accordance with aspects of the present disclosure.

FIG. 8 shows a diagram of a system 800 including a device 805 that supports downlink power adaptation for full-duplex systems in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting downlink power adaptation for full-duplex systems). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for determining that one or more downlink messages to be received from a base station at least partially overlap in time with one or more uplink messages to be transmitted by the UE based on the UE supporting full-duplex communications. The communications manager 820 may be configured as or otherwise support a means for determining a value of a downlink transmission power adjustment for the one or more downlink messages, where the downlink transmission power adjustment is based on the one or more downlink messages at least partially overlapping in time with the one or more uplink messages. The communications manager 820 may be configured as or otherwise support a means for receiving the one or more downlink messages while simultaneously transmitting the one or more uplink messages, where a downlink transmission power of at least one downlink message of the one or more downlink messages is based on the value of the downlink transmission power adjustment.

By including or configuring the communications manager 820 in accordance with examples as described herein, the device 805 may support techniques for performing full-duplex communications with improved reliability based on receiving full-duplex downlink messages with an adapted downlink transmission power. Receiving full-duplex downlink messages with an adapted downlink transmission power may enable the device 805 to more effectively mitigate self-interference associated with performing simultaneous transmission and reception operations.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of downlink power adaptation for full-duplex systems as described herein, or the processor 840 and the memory 830 may be otherwise configured to perform or support such operations.

Figure 9:
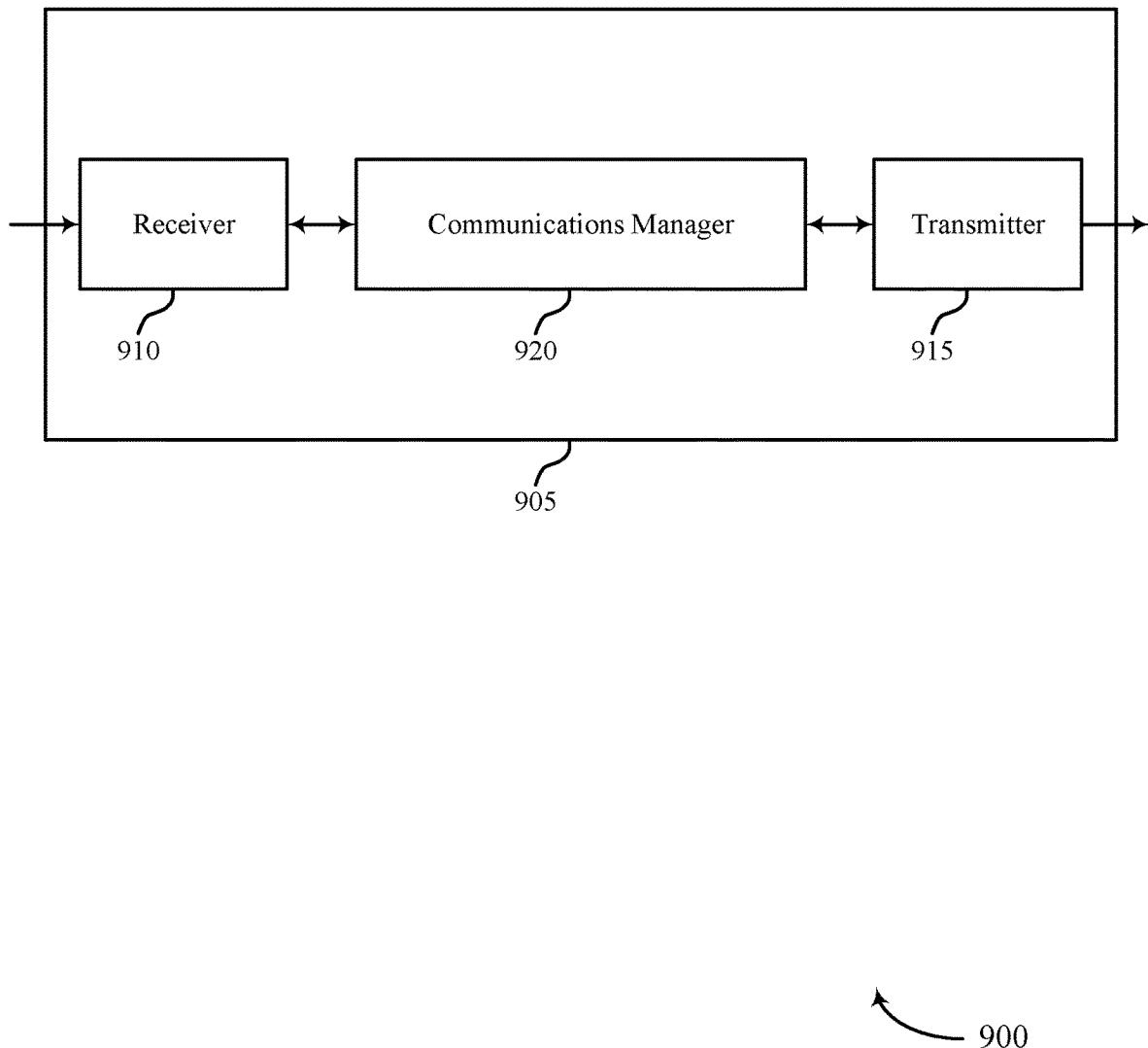
FIGS. 9 and 10 show block diagrams of devices that support downlink power adaptation for full-duplex systems in accordance with aspects of the present disclosure.

FIG. 9 shows a block diagram 900 of a device 905 that supports downlink power adaptation for full-duplex systems in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to downlink power adaptation for full-duplex systems). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to downlink power adaptation for full-duplex systems). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of downlink power adaptation for full-duplex systems as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for determining that one or more downlink messages to be transmitted from the base station at least partially overlap in time with one or more uplink messages to be received from a UE based on the UE supporting full-duplex communications. The communications manager 920 may be configured as or otherwise support a means for configuring a value of a downlink transmission power adjustment for the one or more downlink messages, where the downlink transmission power adjustment is based on the one or more downlink messages at least partially overlapping in time with the one or more uplink messages. The communications manager 920 may be configured as or otherwise support a means for transmitting the one or more downlink messages while simultaneously receiving the one or more uplink messages, where a downlink transmission power of at least one downlink message of the one or more downlink messages is based on the value of the downlink transmission power adjustment.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing and reduced power consumption, among other benefits. For example, the techniques described herein may enable the device 905 to perform full-duplex communications with improved reliability and reduced self-interference, thereby reducing a number of retransmissions requested by the device 905. As a result, the device 905 may spend more time in sleep mode and may consume less power.

Figure 10:
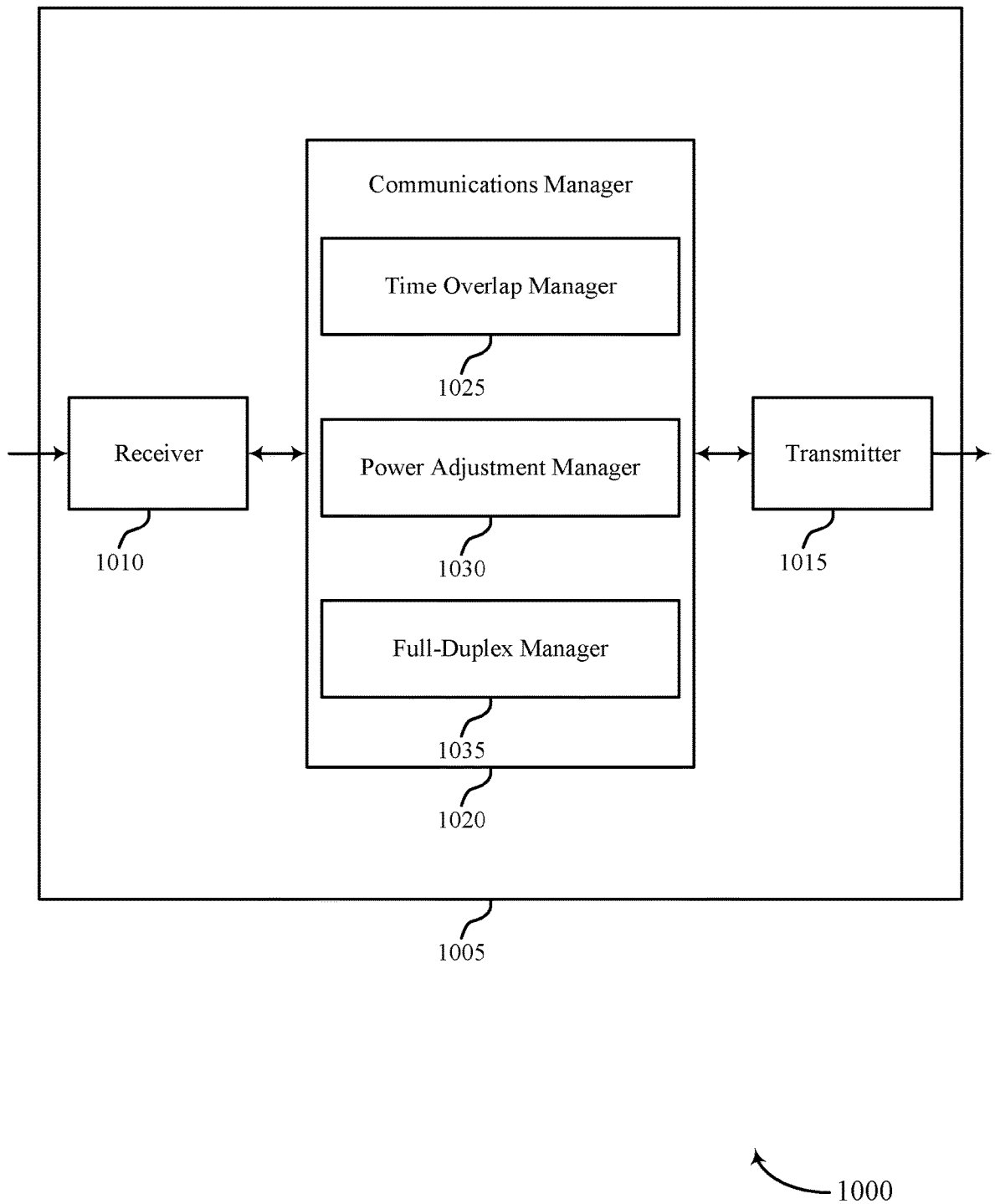

FIG. 10 shows a block diagram 1000 of a device 1005 that supports downlink power adaptation for full-duplex systems in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to downlink power adaptation for full-duplex systems). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to downlink power adaptation for full-duplex systems). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of downlink power adaptation for full-duplex systems as described herein. For example, the communications manager 1020 may include a time overlap manager 1025, a power adjustment manager 1030, a full-duplex manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The time overlap manager 1025 may be configured as or otherwise support a means for determining that one or more downlink messages to be transmitted from the base station at least partially overlap in time with one or more uplink messages to be received from a UE based on the UE supporting full-duplex communications. The power adjustment manager 1030 may be configured as or otherwise support a means for configuring a value of a downlink transmission power adjustment for the one or more downlink messages, where the downlink transmission power adjustment is based on the one or more downlink messages at least partially overlapping in time with the one or more uplink messages. The full-duplex manager 1035 may be configured as or otherwise support a means for transmitting the one or more downlink messages while simultaneously receiving the one or more uplink messages, where a downlink transmission power of at least one downlink message of the one or more downlink messages is based on the value of the downlink transmission power adjustment.

Figure 11:
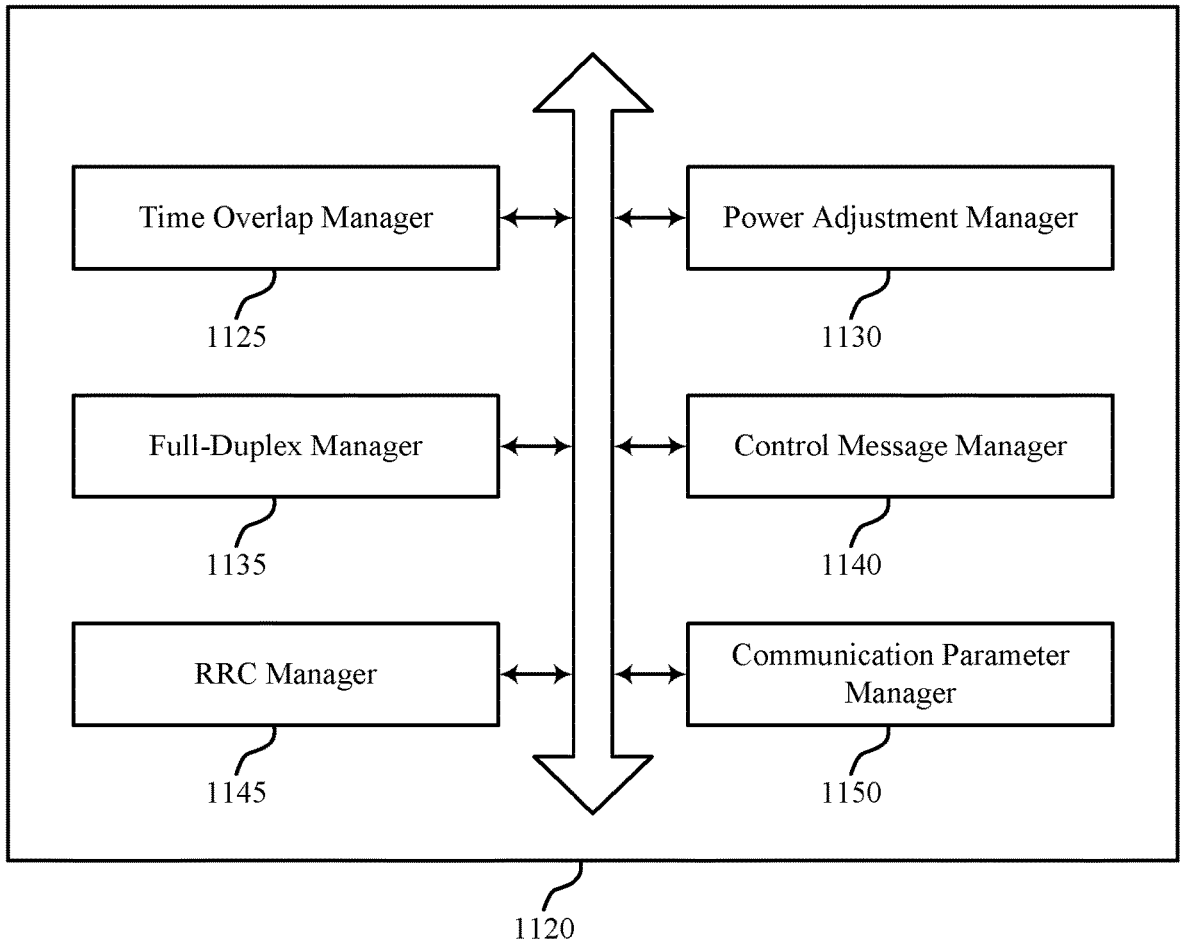
FIG. 11 shows a block diagram of a communications manager that supports downlink power adaptation for full-duplex systems in accordance with aspects of the present disclosure.

FIG. 11 shows a block diagram 1100 of a communications manager 1120 that supports downlink power adaptation for full-duplex systems in accordance with aspects of the present disclosure. The communications manager 1120 may be an example of aspects of a communications manager 920, a communications manager 1020, or both, as described herein. The communications manager 1120, or various components thereof, may be an example of means for performing various aspects of downlink power adaptation for full-duplex systems as described herein. For example, the communications manager 1120 may include a time overlap manager 1125, a power adjustment manager 1130, a full-duplex manager 1135, a control message manager 1140, an RRC manager 1145, a communication parameter manager 1150, or any combination thereof. Each of these components may communicate, directly or indirectly, with one another (e.g., via one or more buses).

The communications manager 1120 may support wireless communication at a base station in accordance with examples as disclosed herein. The time overlap manager 1125 may be configured as or otherwise support a means for determining that one or more downlink messages to be transmitted from the base station at least partially overlap in time with one or more uplink messages to be received from a UE based on the UE supporting full-duplex communications. The power adjustment manager 1130 may be configured as or otherwise support a means for configuring a value of a downlink transmission power adjustment for the one or more downlink messages, where the downlink transmission power adjustment is based on the one or more downlink messages at least partially overlapping in time with the one or more uplink messages. The full-duplex manager 1135 may be configured as or otherwise support a means for transmitting the one or more downlink messages while simultaneously receiving the one or more uplink messages, where a downlink transmission power of at least one downlink message of the one or more downlink messages is based on the value of the downlink transmission power adjustment.

In some examples, the control message manager 1140 may be configured as or otherwise support a means for transmitting, to the UE, a control message indicating the value of the downlink transmission power adjustment, where the control message includes a bit field indicating the value of the downlink transmission power adjustment.

In some examples, the power adjustment manager 1130 may be configured as or otherwise support a means for selecting the value of the downlink transmission power adjustment from a set of two or more values of the downlink transmission power adjustment; where a configuration of the set of two or more values of the downlink transmission power adjustment is indicated to the UE via RRC signaling. In some examples, the control message includes DCI scheduling the one or more downlink messages.

In some examples, the communication parameter manager 1150 may be configured as or otherwise support a means for identifying one or more communications parameters including a downlink resource allocation, an uplink resource allocation, an MCS, one or more channel measurements, an RSRP, an RSSI, one or more self-interference measurements, or any combination thereof, where the value of the downlink transmission power adjustment is based on the one or more communications parameters.

In some examples, the RRC manager 1145 may be configured as or otherwise support a means for transmitting, to the UE, RRC signaling configuring a rule for determining the value of the downlink transmission power adjustment, where the rule is associated with one or more tables that indicate the value of the downlink transmission power adjustment.

In some examples, the power adjustment manager 1130 may be configured as or otherwise support a means for applying the value of the downlink transmission power adjustment to each downlink message of the one or more downlink messages, where the downlink transmission power is based on applying the value of the downlink transmission power adjustment to each downlink message of the one or more downlink messages.

In some examples, the power adjustment manager 1130 may be configured as or otherwise support a means for applying the value of the downlink transmission power adjustment to one or more resource blocks, one or more symbols, or any combination thereof, corresponding to the one or more downlink messages that at least partially overlap with the one or more uplink messages, where the downlink transmission power is based on applying the value of the downlink transmission power adjustment to each downlink message of the one or more downlink messages.

In some examples, the power adjustment manager 1130 may be configured as or otherwise support a means for applying the value of the downlink transmission power adjustment to one or more resource blocks of the one or more downlink messages based on a rule, the rule being associated with the one or more downlink messages and the one or more uplink messages satisfying a performance threshold, where the downlink transmission power is based on applying the value of the downlink transmission power adjustment to each downlink message of the one or more downlink messages.

In some examples, the power adjustment manager 1130 may be configured as or otherwise support a means for determining an increase of the downlink transmission power based on the one or more downlink messages at least partially overlapping in time with the one or more uplink messages, where the value of the downlink transmission power adjustment indicates the increase to the downlink transmission power.

In some examples, the power adjustment manager 1130 may be configured as or otherwise support a means for determining a decrease of the downlink transmission power based on the one or more downlink messages at least partially overlapping in time with the one or more uplink messages, where the value of the downlink transmission power adjustment indicates the increase to the downlink transmission power.

In some examples, the power adjustment manager 1130 may be configured as or otherwise support a means for determining that the downlink transmission power is to remain unchanged based on the one or more downlink messages at least partially overlapping in time with the one or more uplink messages, where the value of the downlink transmission power adjustment indicates that the downlink transmission power remains unchanged.

Figure 12:
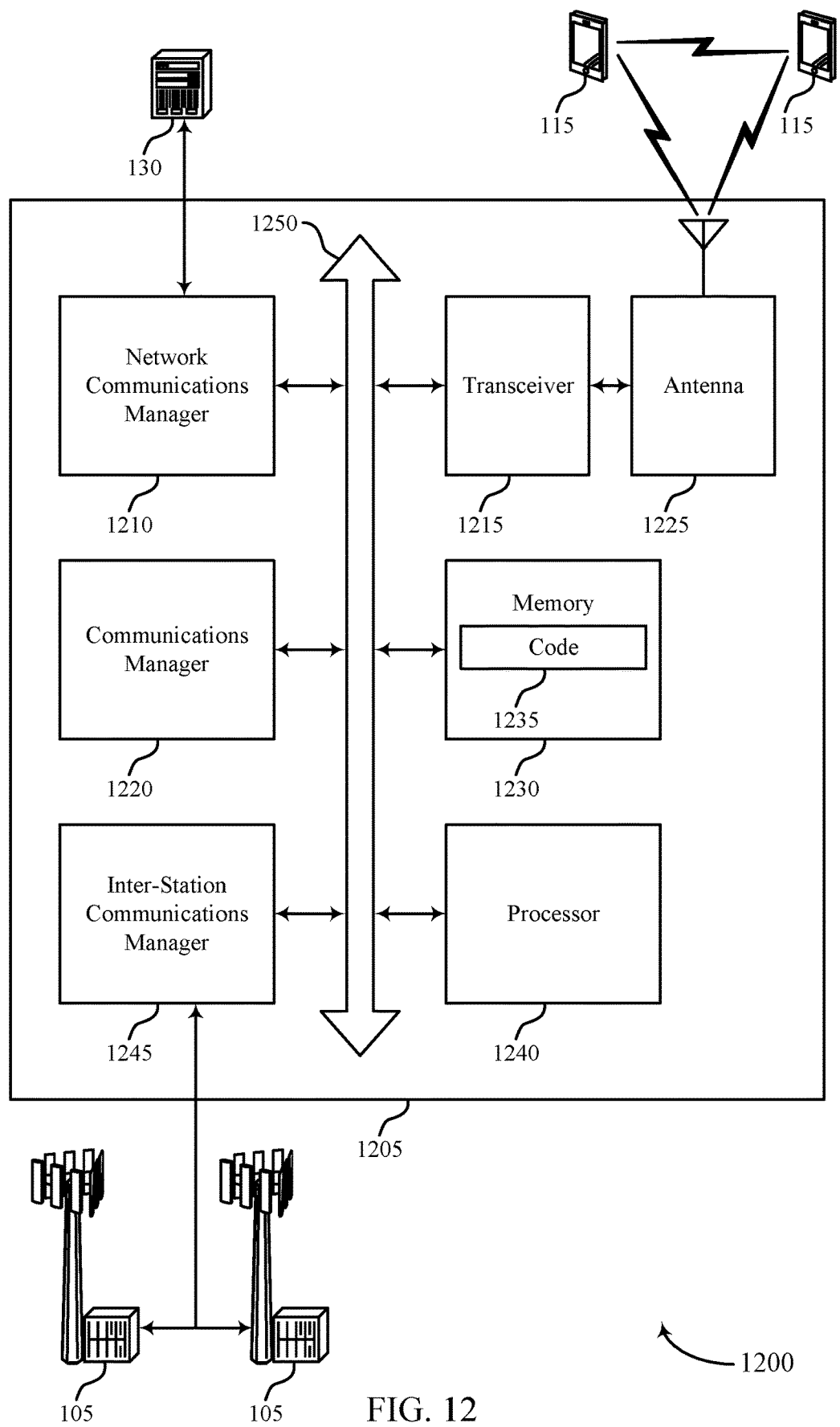
FIG. 12 shows a diagram of a system including a device that supports downlink power adaptation for full-duplex systems in accordance with aspects of the present disclosure.

FIG. 12 shows a diagram of a system 1200 including a device 1205 that supports downlink power adaptation for full-duplex systems in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting downlink power adaptation for full-duplex systems). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for determining that one or more downlink messages to be transmitted from the base station at least partially overlap in time with one or more uplink messages to be received from a UE based on the UE supporting full-duplex communications. The communications manager 1220 may be configured as or otherwise support a means for configuring a value of a downlink transmission power adjustment for the one or more downlink messages, where the downlink transmission power adjustment is based on the one or more downlink messages at least partially overlapping in time with the one or more uplink messages. The communications manager 1220 may be configured as or otherwise support a means for transmitting the one or more downlink messages while simultaneously receiving the one or more uplink messages, where a downlink transmission power of at least one downlink message of the one or more downlink messages is based on the value of the downlink transmission power adjustment.

By including or configuring the communications manager 1220 in accordance with examples as described herein, the device 1205 may support techniques for performing full-duplex communications with improved reliability based on adjusting a downlink transmission power of the full-duplex communications to mitigate self-interference.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of downlink power adaptation for full-duplex systems as described herein, or the processor 1240 and the memory 1230 may be otherwise configured to perform or support such operations.

Figure 13:
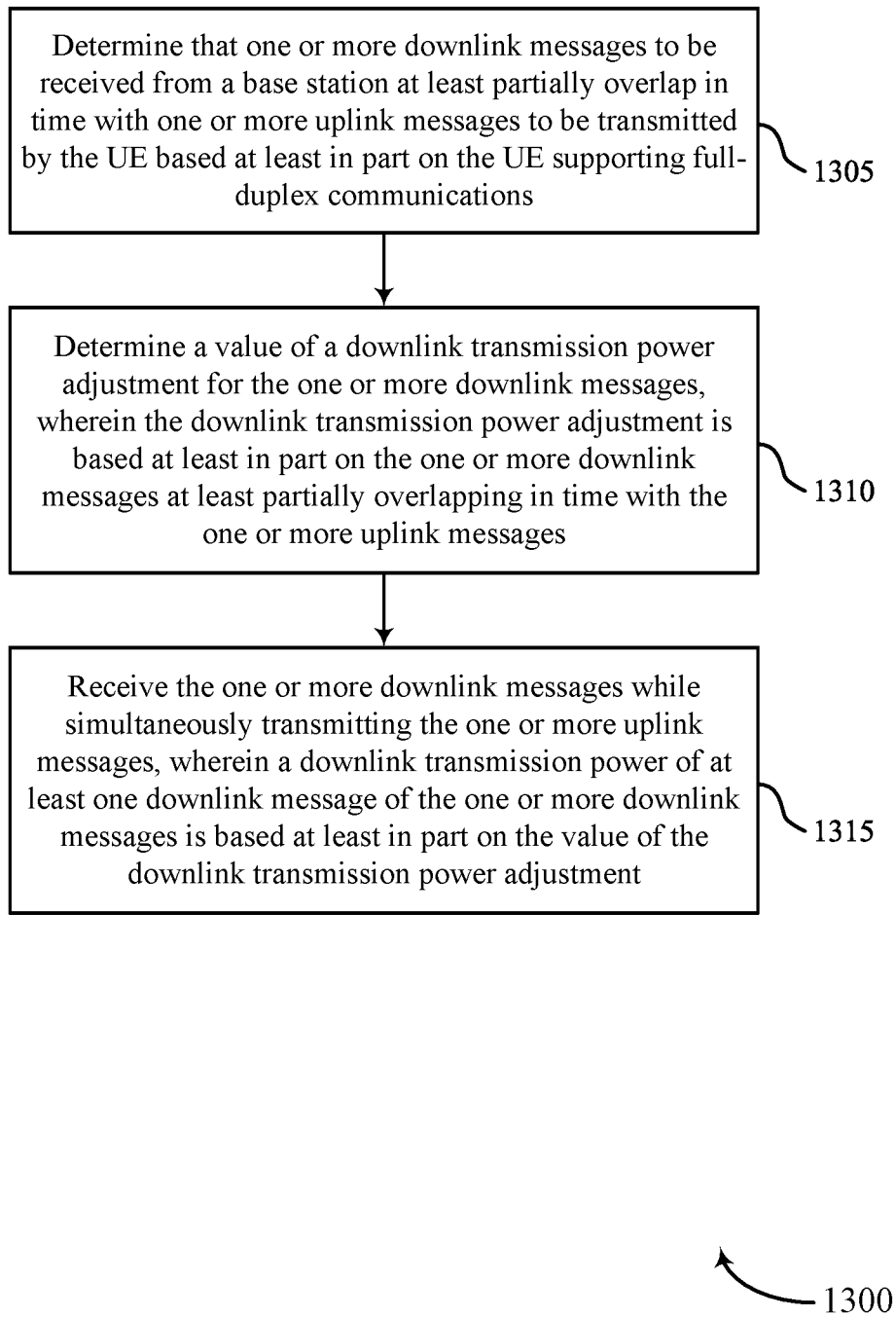
FIGS. 13 through 18 show flowcharts illustrating methods that support downlink power adaptation for full-duplex systems in accordance with aspects of the present disclosure.

FIG. 13 shows a flowchart illustrating a method 1300 that supports downlink power adaptation for full-duplex systems in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include determining that one or more downlink messages to be received from a base station at least partially overlap in time with one or more uplink messages to be transmitted by the UE based on the UE supporting full-duplex communications. The operations of 1305 may be performed in accordance with examples as disclosed herein. In some examples, aspects of the operations of 1305 may be performed by a time overlap component 725 as described with reference to FIG. 7.

At 1310, the method may include determining a value of a downlink transmission power adjustment for the one or more downlink messages, where the downlink transmission power adjustment is based on the one or more downlink messages at least partially overlapping in time with the one or more uplink messages.

The operations of 1310 may be performed in accordance with examples as disclosed herein. In some examples, aspects of the operations of 1310 may be performed by a power adjustment component 730 as described with reference to FIG. 7.

At 1315, the method may include receiving the one or more downlink messages while simultaneously transmitting the one or more uplink messages, where a downlink transmission power of at least one downlink message of the one or more downlink messages is based on the value of the downlink transmission power adjustment. The operations of 1315 may be performed in accordance with examples as disclosed herein. In some examples, aspects of the operations of 1315 may be performed by a full-duplex component 735 as described with reference to FIG. 7.

Figure 14:
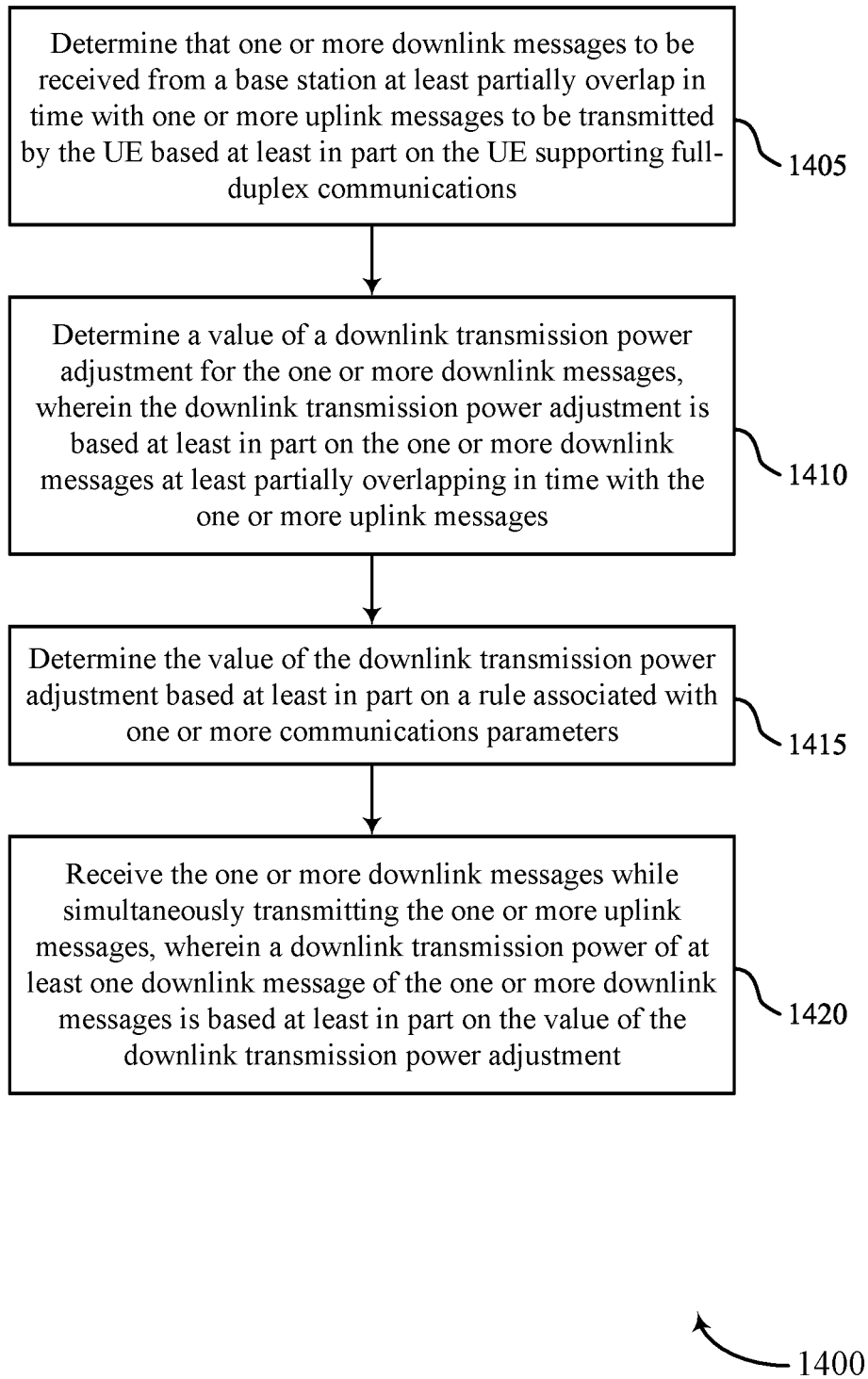

FIG. 14 shows a flowchart illustrating a method 1400 that supports downlink power adaptation for full-duplex systems in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include determining that one or more downlink messages to be received from a base station at least partially overlap in time with one or more uplink messages to be transmitted by the UE based on the UE supporting full-duplex communications. The operations of 1405 may be performed in accordance with examples as disclosed herein. In some examples, aspects of the operations of 1405 may be performed by a time overlap component 725 as described with reference to FIG. 7.

At 1410, the method may include determining a value of a downlink transmission power adjustment for the one or more downlink messages, where the downlink transmission power adjustment is based on the one or more downlink messages at least partially overlapping in time with the one or more uplink messages. The operations of 1410 may be performed in accordance with examples as disclosed herein. In some examples, aspects of the operations of 1410 may be performed by a power adjustment component 730 as described with reference to FIG. 7.

At 1415, the method may include determining the value of the downlink transmission power adjustment based on a rule associated with one or more communications parameters. The operations of 1415 may be performed in accordance with examples as disclosed herein. In some examples, aspects of the operations of 1415 may be performed by a power adjustment component 730 as described with reference to FIG. 7.

At 1420, the method may include receiving the one or more downlink messages while simultaneously transmitting the one or more uplink messages, where a downlink transmission power of at least one downlink message of the one or more downlink messages is based on the value of the downlink transmission power adjustment. The operations of 1420 may be performed in accordance with examples as disclosed herein. In some examples, aspects of the operations of 1420 may be performed by a full-duplex component 735 as described with reference to FIG. 7.

Figure 15:
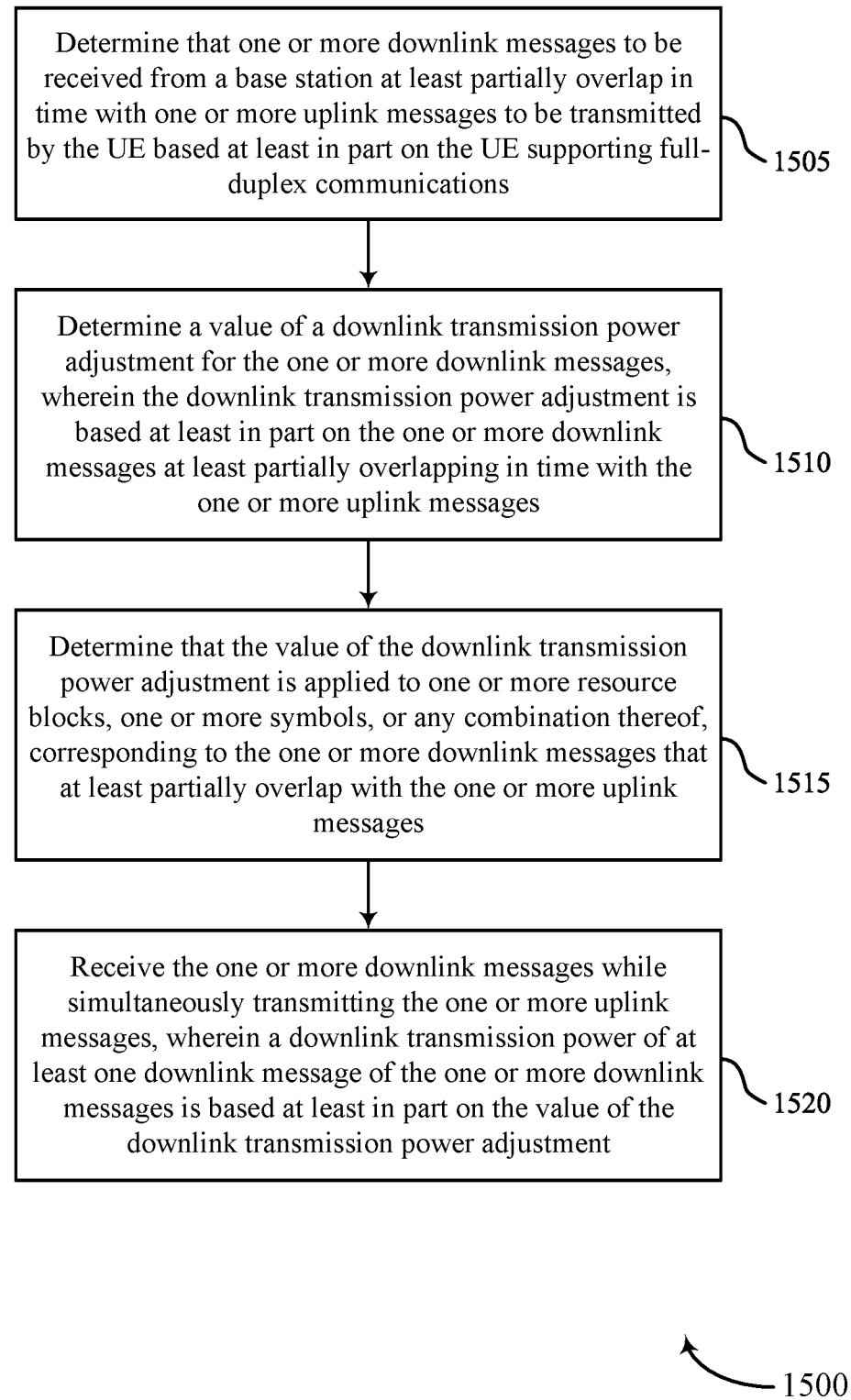

FIG. 15 shows a flowchart illustrating a method 1500 that supports downlink power adaptation for full-duplex systems in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include determining that one or more downlink messages to be received from a base station at least partially overlap in time with one or more uplink messages to be transmitted by the UE based on the UE supporting full-duplex communications. The operations of 1505 may be performed in accordance with examples as disclosed herein. In some examples, aspects of the operations of 1505 may be performed by a time overlap component 725 as described with reference to FIG. 7.

At 1510, the method may include determining a value of a downlink transmission power adjustment for the one or more downlink messages, where the downlink transmission power adjustment is based on the one or more downlink messages at least partially overlapping in time with the one or more uplink messages. The operations of 1510 may be performed in accordance with examples as disclosed herein. In some examples, aspects of the operations of 1510 may be performed by a power adjustment component 730 as described with reference to FIG. 7.

At 1515, the method may include determining that the value of the downlink transmission power adjustment is applied to one or more resource blocks, one or more symbols, or any combination thereof, corresponding to the one or more downlink messages that at least partially overlap with the one or more uplink messages. The operations of 1515 may be performed in accordance with examples as disclosed herein. In some examples, aspects of the operations of 1515 may be performed by a power adjustment component 730 as described with reference to FIG. 7.

At 1520, the method may include receiving the one or more downlink messages while simultaneously transmitting the one or more uplink messages, where a downlink transmission power of at least one downlink message of the one or more downlink messages is based on the value of the downlink transmission power adjustment. The operations of 1520 may be performed in accordance with examples as disclosed herein. In some examples, aspects of the operations of 1520 may be performed by a full-duplex component 735 as described with reference to FIG. 7.

Figure 16:
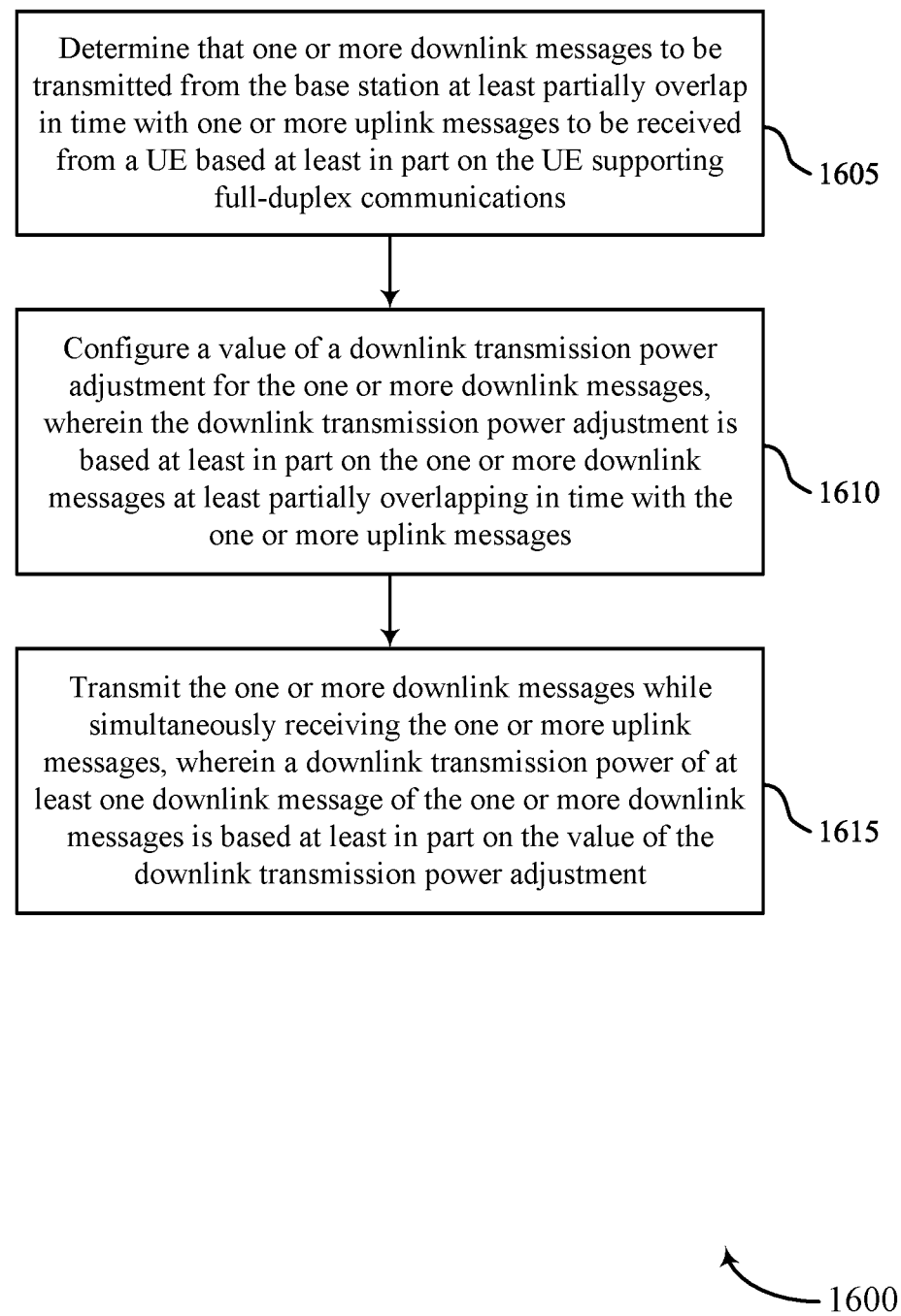

FIG. 16 shows a flowchart illustrating a method 1600 that supports downlink power adaptation for full-duplex systems in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include determining that one or more downlink messages to be transmitted from the base station at least partially overlap in time with one or more uplink messages to be received from a UE based on the UE supporting full-duplex communications. The operations of 1605 may be performed in accordance with examples as disclosed herein. In some examples, aspects of the operations of 1605 may be performed by a time overlap manager 1125 as described with reference to FIG. 11.

At 1610, the method may include configuring a value of a downlink transmission power adjustment for the one or more downlink messages, where the downlink transmission power adjustment is based on the one or more downlink messages at least partially overlapping in time with the one or more uplink messages. The operations of 1610 may be performed in accordance with examples as disclosed herein. In some examples, aspects of the operations of 1610 may be performed by a power adjustment manager 1130 as described with reference to FIG. 11.

At 1615, the method may include transmitting the one or more downlink messages while simultaneously receiving the one or more uplink messages, where a downlink transmission power of at least one downlink message of the one or more downlink messages is based on the value of the downlink transmission power adjustment. The operations of 1615 may be performed in accordance with examples as disclosed herein. In some examples, aspects of the operations of 1615 may be performed by a full-duplex manager 1135 as described with reference to FIG. 11.

Figure 17:
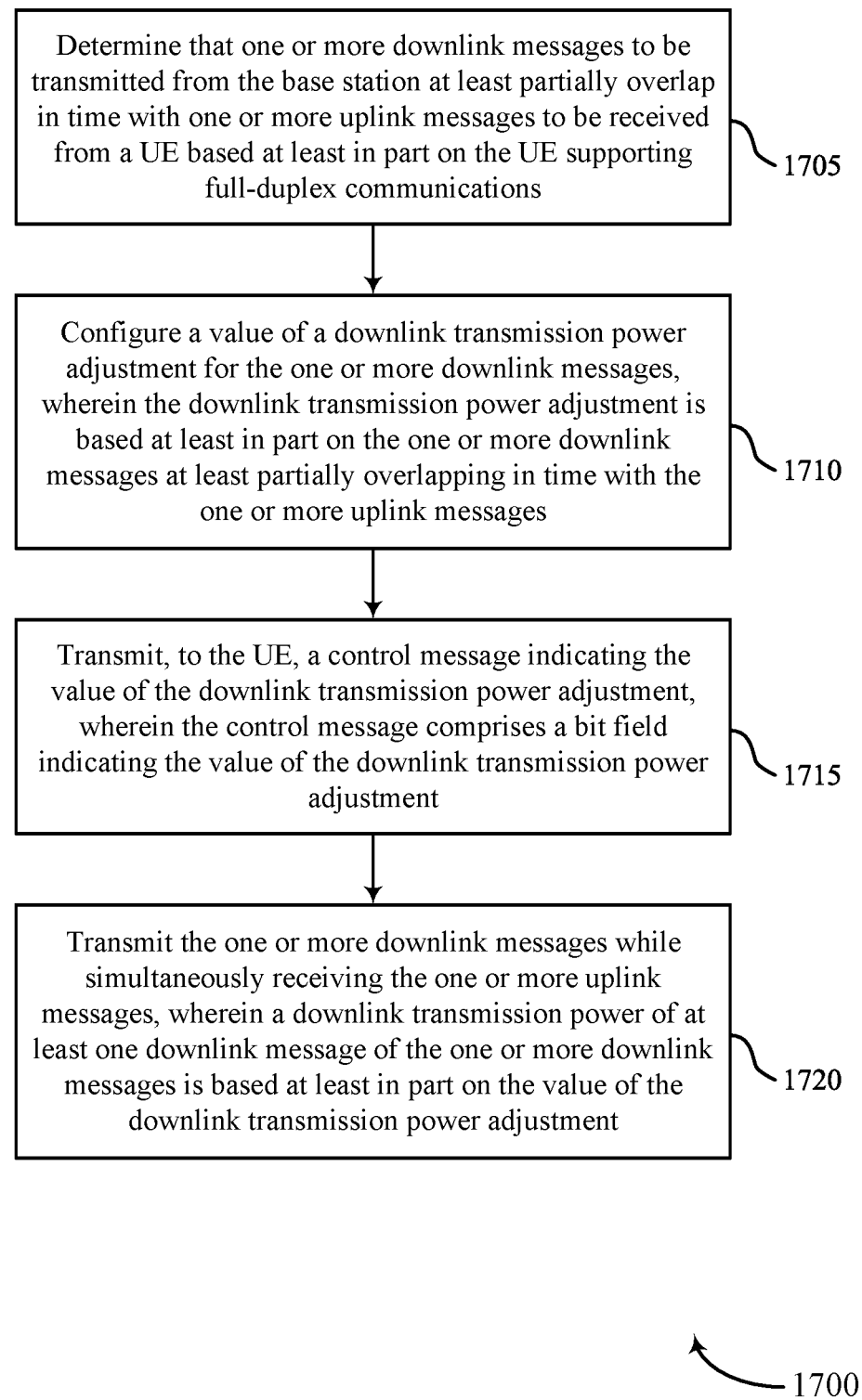

FIG. 17 shows a flowchart illustrating a method 1700 that supports downlink power adaptation for full-duplex systems in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include determining that one or more downlink messages to be transmitted from the base station at least partially overlap in time with one or more uplink messages to be received from a UE based on the UE supporting full-duplex communications. The operations of 1705 may be performed in accordance with examples as disclosed herein. In some examples, aspects of the operations of 1705 may be performed by a time overlap manager 1125 as described with reference to FIG. 11.

At 1710, the method may include configuring a value of a downlink transmission power adjustment for the one or more downlink messages, where the downlink transmission power adjustment is based on the one or more downlink messages at least partially overlapping in time with the one or more uplink messages. The operations of 1710 may be performed in accordance with examples as disclosed herein. In some examples, aspects of the operations of 1710 may be performed by a power adjustment manager 1130 as described with reference to FIG. 11.

At 1715, the method may include transmitting, to the UE, a control message indicating the value of the downlink transmission power adjustment, where the control message includes a bit field indicating the value of the downlink transmission power adjustment. The operations of 1715 may be performed in accordance with examples as disclosed herein. In some examples, aspects of the operations of 1715 may be performed by a control message manager 1140 as described with reference to FIG. 11.

At 1720, the method may include transmitting the one or more downlink messages while simultaneously receiving the one or more uplink messages, where a downlink transmission power of at least one downlink message of the one or more downlink messages is based on the value of the downlink transmission power adjustment. The operations of 1720 may be performed in accordance with examples as disclosed herein. In some examples, aspects of the operations of 1720 may be performed by a full-duplex manager 1135 as described with reference to FIG. 11.

Figure 18:
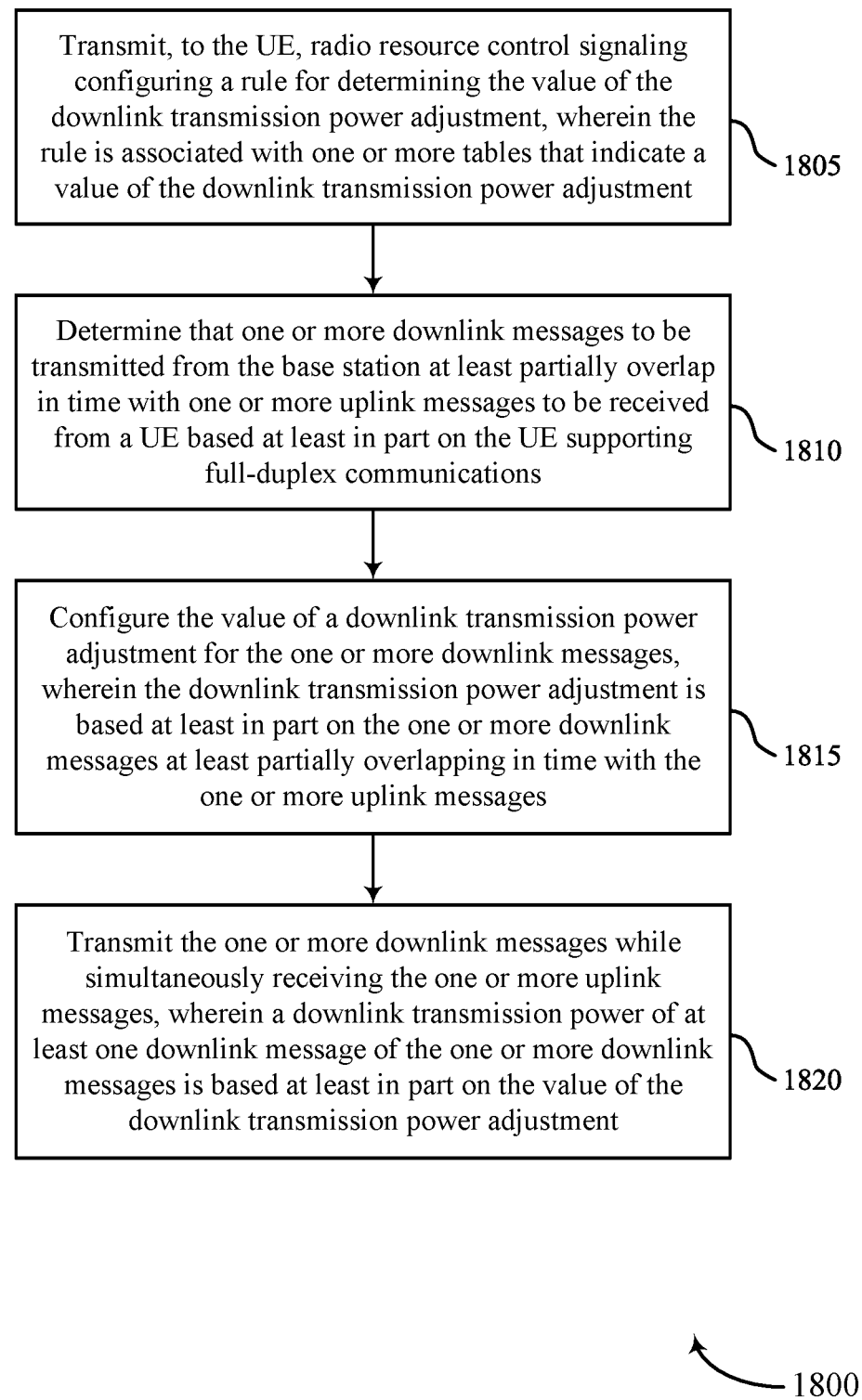

FIG. 18 shows a flowchart illustrating a method 1800 that supports downlink power adaptation for full-duplex systems in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting, to the UE, RRC signaling configuring a rule for determining a value of the downlink transmission power adjustment, where the rule is associated with one or more tables that indicate the value of the downlink transmission power adjustment. The operations of 1805 may be performed in accordance with examples as disclosed herein. In some examples, aspects of the operations of 1805 may be performed by an RRC manager 1145 as described with reference to FIG. 11.

At 1810, the method may include determining that one or more downlink messages to be transmitted from the base station at least partially overlap in time with one or more uplink messages to be received from a UE based on the UE supporting full-duplex communications. The operations of 1810 may be performed in accordance with examples as disclosed herein. In some examples, aspects of the operations of 1810 may be performed by a time overlap manager 1125 as described with reference to FIG. 11.

At 1815, the method may include configuring the value of a downlink transmission power adjustment for the one or more downlink messages, where the downlink transmission power adjustment is based on the one or more downlink messages at least partially overlapping in time with the one or more uplink messages. The operations of 1815 may be performed in accordance with examples as disclosed herein. In some examples, aspects of the operations of 1815 may be performed by a power adjustment manager 1130 as described with reference to FIG. 11.

At 1820, the method may include transmitting the one or more downlink messages while simultaneously receiving the one or more uplink messages, where a downlink transmission power of at least one downlink message of the one or more downlink messages is based on the value of the downlink transmission power adjustment. The operations of 1820 may be performed in accordance with examples as disclosed herein. In some examples, aspects of the operations of 1820 may be performed by a full-duplex manager 1135 as described with reference to FIG. 11.

The following provides an overview of aspects of the present disclosure:

Aspect 1: A method for wireless communication at a UE, comprising: determining that one or more downlink messages to be received from a base station at least partially overlap in time with one or more uplink messages to be transmitted by the UE based at least in part on the UE supporting full-duplex communications; determining a value of a downlink transmission power adjustment for the one or more downlink messages, wherein the downlink transmission power adjustment is based at least in part on the one or more downlink messages at least partially overlapping in time with the one or more uplink messages; and receiving the one or more downlink messages while simultaneously transmitting the one or more uplink messages, wherein a downlink transmission power of at least one downlink message of the one or more downlink messages is based at least in part on the value of the downlink transmission power adjustment.

Aspect 2: The method of aspect 1, wherein determining the value of the downlink transmission power adjustment comprises: receiving, from the base station, a control message indicating the value of the downlink transmission power adjustment, wherein the value of the downlink transmission power adjustment is determined based at least in part on receiving the control message.

Aspect 3: The method of aspect 2, further comprising: identifying, within the control message, a bit field indicating the value of the downlink transmission power adjustment, wherein the value of the downlink transmission power adjustment is from a set of two or more values of the downlink transmission power adjustment that are configured via RRC signaling.

Aspect 4: The method of any of aspects 2 through 3, wherein the control message comprises DCI scheduling the one or more downlink messages from the base station.

Aspect 5: The method of any of aspects 2 through 4, wherein the value of the downlink transmission power adjustment is based at least in part on one or more communications parameters comprising a downlink resource allocation, an uplink resource allocation, an MCS, one or more channel measurements, an RSRP, an RSSI, one or more self-interference measurements, or any combination thereof.

Aspect 6: The method of any of aspects 1 through 5, wherein determining the value of the downlink transmission power adjustment comprises: determining the value of the downlink transmission power adjustment based at least in part on a rule associated with one or more communications parameters.

Aspect 7: The method of aspect 6, further comprising: receiving RRC signaling configuring the rule; and determining the rule based at least in part on receiving the RRC signaling.

Aspect 8: The method of any of aspects 6 through 7, wherein the rule is associated with one or more tables that indicate the value of the downlink transmission power adjustment.

Aspect 9: The method of any of aspects 6 through 8, further comprising: identifying the one or more communications parameters based at least in part on the one or more downlink messages at least partially overlapping in time with the one or more uplink messages, the one or more communications parameters comprising a priority of the one or more uplink messages, a priority of the one or more downlink messages, a downlink resource allocation, an uplink resource allocation, an overlap between the one or more downlink messages and the one or more uplink messages, an MCS associated with the one or more downlink messages, an MCS associated with the one or more uplink messages, a rank associated with the one or more downlink messages, a rank associated with the one or more uplink messages, one or more channel measurements, an RSRP, an RSSI, one or more self-interference measurements, or any combination thereof.

Aspect 10: The method of any of aspects 1 through 9, further comprising: determining that the value of the downlink transmission power adjustment is applied to each downlink message of the one or more downlink messages.

Aspect 11: The method of any of aspects 1 through 10, further comprising: determining that the value of the downlink transmission power adjustment is applied to one or more RBs, one or more symbols, or any combination thereof, corresponding to the one or more downlink messages that at least partially overlap with the one or more uplink messages.

Aspect 12: The method of any of aspects 1 through 11, further comprising: determining that the value of the downlink transmission power adjustment is applied to one or more RBs of the one or more downlink messages based at least in part on a rule, the rule being associated with the one or more downlink messages and the one or more uplink messages satisfying a performance threshold.

Aspect 13: The method of any of aspects 1 through 12, further comprising: identifying an increase in the downlink transmission power based at least in part on the value of the downlink transmission power adjustment.

Aspect 14: The method of any of aspects 1 through 12, further comprising: identifying a decrease in the downlink transmission power based at least in part on the value of the downlink transmission power adjustment.

Aspect 15: The method of any of aspects 1 through 12, further comprising: determining that the downlink transmission power is unchanged based at least in part on the value of the downlink transmission power adjustment.

Aspect 16: A method for wireless communication at a base station, comprising: determining that one or more downlink messages to be transmitted from the base station at least partially overlap in time with one or more uplink messages to be received from a UE based at least in part on the UE supporting full-duplex communications; configuring a value of a downlink transmission power adjustment for the one or more downlink messages, wherein the downlink transmission power adjustment is based at least in part on the one or more downlink messages at least partially overlapping in time with the one or more uplink messages; and transmitting the one or more downlink messages while simultaneously receiving the one or more uplink messages, wherein a downlink transmission power of at least one downlink message of the one or more downlink messages is based at least in part on the value of the downlink transmission power adjustment.

Aspect 17: The method of aspect 16, further comprising: transmitting, to the UE, a control message indicating the value of the downlink transmission power adjustment, wherein the control message comprises a bit field indicating the value of the downlink transmission power adjustment.

Aspect 18: The method of aspect 17, further comprising: selecting the value of the downlink transmission power adjustment from a set of two or more values of the downlink transmission power adjustment; wherein a configuration of the set of two or more values of the downlink transmission power adjustment is indicated to the UE via RRC signaling.

Aspect 19: The method of any of aspects 17 through 18, wherein the control message comprises DCI scheduling the one or more downlink messages.

Aspect 20: The method of any of aspects 17 through 19, further comprising: identifying one or more communications parameters comprising a downlink resource allocation, an uplink resource allocation, an MCS, one or more channel measurements, an RSRP, an RSSI, one or more self-interference measurements, or any combination thereof, wherein the value of the downlink transmission power adjustment is based at least in part on the one or more communications parameters.

Aspect 21: The method of any of aspects 16 through 20, further comprising: transmitting, to the UE, RRC signaling configuring a rule for determining the value of the downlink transmission power adjustment, wherein the rule is associated with one or more tables that indicate the value of the downlink transmission power adjustment.

Aspect 22: The method of any of aspects 16 through 21, further comprising: applying the value of the downlink transmission power adjustment to each downlink message of the one or more downlink messages, wherein the downlink transmission power is based at least in part on applying the value of the downlink transmission power adjustment to each downlink message of the one or more downlink messages.

Aspect 23: The method of any of aspects 16 through 22, further comprising: applying the value of the downlink transmission power adjustment to one or more RBs, one or more symbols, or any combination thereof, corresponding to the one or more downlink messages that at least partially overlap with the one or more uplink messages, wherein the downlink transmission power is based at least in part on applying the value of the downlink transmission power adjustment to each downlink message of the one or more downlink messages.

Aspect 24: The method of any of aspects 16 through 23, further comprising: applying the value of the downlink transmission power adjustment to one or more RBs of the one or more downlink messages based at least in part on a rule, the rule being associated with the one or more downlink messages and the one or more uplink messages satisfying a performance threshold, wherein the downlink transmission power is based at least in part on applying the value of the downlink transmission power adjustment to each downlink message of the one or more downlink messages.

Aspect 25: The method of any of aspects 16 through 24, further comprising: determining an increase of the downlink transmission power based at least in part on the one or more downlink messages at least partially overlapping in time with the one or more uplink messages, wherein the value of the downlink transmission power adjustment indicates the increase to the downlink transmission power.

Aspect 26: The method of any of aspects 16 through 24, further comprising: determining a decrease of the downlink transmission power based at least in part on the one or more downlink messages at least partially overlapping in time with the one or more uplink messages, wherein the value of the downlink transmission power adjustment indicates the increase to the downlink transmission power.

Aspect 27: The method of any of aspects 16 through 24, further comprising: determining that the downlink transmission power is to remain unchanged based at least in part on the one or more downlink messages at least partially overlapping in time with the one or more uplink messages, wherein the value of the downlink transmission power adjustment indicates that the downlink transmission power remains unchanged.

Aspect 28: An apparatus for wireless communication at a UE, comprising a processor; memory coupled with the processor; and instructions stored in the memory and executable by the processor to cause the apparatus to perform a method of any of aspects 1 through 15.

Aspect 29: An apparatus for wireless communication at a UE, comprising at least one means for performing a method of any of aspects 1 through 15.

Aspect 30: A non-transitory computer-readable medium storing code for wireless communication at a UE, the code comprising instructions executable by a processor to perform a method of any of aspects 1 through 15.

Aspect 31: An apparatus for wireless communication at a base station, comprising a processor; memory coupled with the processor; and instructions stored in the memory and executable by the processor to cause the apparatus to perform a method of any of aspects 16 through 27.

Aspect 32: An apparatus for wireless communication at a base station, comprising at least one means for performing a method of any of aspects 16 through 27.

Aspect 33: A non-transitory computer-readable medium storing code for wireless communication at a base station, the code comprising instructions executable by a processor to perform a method of any of aspects 16 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   determining that one or more downlink messages to be received from a base station at least partially overlap in time with one or more uplink messages to be transmitted by the UE based at least in part on the UE supporting full-duplex communications;
   determining a value of a downlink transmission power adjustment for the one or more downlink messages, wherein the downlink transmission power adjustment is based at least in part on the one or more downlink messages at least partially overlapping in time with the one or more uplink messages; and
   receiving the one or more downlink messages while simultaneously transmitting the one or more uplink messages, wherein a downlink transmission power of at least one downlink message of the one or more downlink messages is based at least in part on the value of the downlink transmission power adjustment.

2. The method of claim 1, wherein determining the value of the downlink transmission power adjustment comprises:
   receiving, from the base station, a control message indicating the value of the downlink transmission power adjustment, wherein the value of the downlink transmission power adjustment is determined based at least in part on receiving the control message.

3. The method of claim 2, further comprising:
   identifying, within the control message, a bit field indicating the value of the downlink transmission power adjustment, wherein the value of the downlink transmission power adjustment is from a set of two or more values of the downlink transmission power adjustment that are configured via radio resource control signaling.

4. The method of claim 2, wherein the control message comprises downlink control information scheduling the one or more downlink messages from the base station.

5. The method of claim 2, wherein the value of the downlink transmission power adjustment is based at least in part on one or more communications parameters comprising a downlink resource allocation, an uplink resource allocation, a modulation and coding scheme, one or more channel measurements, a reference signal received power, a received signal strength indicator, one or more self-interference measurements, or any combination thereof.

6. The method of claim 1, wherein determining the value of the downlink transmission power adjustment comprises:

determining the value of the downlink transmission power adjustment based at least in part on a rule associated with one or more communications parameters.

7. The method of claim 6, further comprising:
receiving radio resource control signaling configuring the rule; and
determining the rule based at least in part on receiving the radio resource control signaling.

8. The method of claim 6, wherein the rule is associated with one or more tables that indicate the value of the downlink transmission power adjustment.

9. The method of claim 6, further comprising:
identifying the one or more communications parameters based at least in part on the one or more downlink messages at least partially overlapping in time with the one or more uplink messages, the one or more communications parameters comprising a priority of the one or more uplink messages, a priority of the one or more downlink messages, a downlink resource allocation, an uplink resource allocation, an overlap between the one or more downlink messages and the one or more uplink messages, a modulation and coding scheme associated with the one or more downlink messages, a modulation and coding scheme associated with the one or more uplink messages, a rank associated with the one or more downlink messages, a rank associated with the one or more uplink messages, one or more channel measurements, a reference signal received power, a received signal strength indicator, one or more self-interference measurements, or any combination thereof.

10. The method of claim 1, further comprising:
determining that the value of the downlink transmission power adjustment is applied to each downlink message of the one or more downlink messages.

11. The method of claim 1, further comprising:
determining that the value of the downlink transmission power adjustment is applied to one or more resource blocks, one or more symbols, or any combination thereof, corresponding to the one or more downlink messages that at least partially overlap with the one or more uplink messages.

12. The method of claim 1, further comprising:
determining that the value of the downlink transmission power adjustment is applied to one or more resource blocks of the one or more downlink messages based at least in part on a rule, the rule being associated with the one or more downlink messages and the one or more uplink messages satisfying a performance threshold.

13. The method of claim 1, further comprising:
identifying an increase in the downlink transmission power based at least in part on the value of the downlink transmission power adjustment.

14. The method of claim 1, further comprising:
identifying a decrease in the downlink transmission power based at least in part on the value of the downlink transmission power adjustment.

15. The method of claim 1, further comprising:
determining that the downlink transmission power is unchanged based at least in part on the value of the downlink transmission power adjustment.

16. A method for wireless communication at a base station, comprising:
determining that one or more downlink messages to be transmitted from the base station at least partially overlap in time with one or more uplink messages to be received from a user equipment (UE) based at least in part on the UE supporting full-duplex communications;
configuring a value of a downlink transmission power adjustment for the one or more downlink messages, wherein the downlink transmission power adjustment is based at least in part on the one or more downlink messages at least partially overlapping in time with the one or more uplink messages; and
transmitting the one or more downlink messages while simultaneously receiving the one or more uplink messages, wherein a downlink transmission power of at least one downlink message of the one or more downlink messages is based at least in part on the value of the downlink transmission power adjustment.

17. The method of claim 16, further comprising:
transmitting, to the UE, a control message indicating the value of the downlink transmission power adjustment, wherein the control message comprises a bit field indicating the value of the downlink transmission power adjustment.

18. The method of claim 17, further comprising:
selecting the value of the downlink transmission power adjustment from a set of two or more values of the downlink transmission power adjustment; wherein a configuration of the set of two or more values of the downlink transmission power adjustment is indicated to the UE via radio resource control signaling.

19. The method of claim 17, wherein the control message comprises downlink control information scheduling the one or more downlink messages.

20. The method of claim 17, further comprising:
identifying one or more communications parameters comprising a downlink resource allocation, an uplink resource allocation, a modulation and coding scheme, one or more channel measurements, a reference signal received power, a received signal strength indicator, one or more self-interference measurements, or any combination thereof, wherein the value of the downlink transmission power adjustment is based at least in part on the one or more communications parameters.

21. The method of claim 16, further comprising:
transmitting, to the UE, radio resource control signaling configuring a rule for determining the value of the downlink transmission power adjustment, wherein the rule is associated with one or more tables that indicate the value of the downlink transmission power adjustment.

22. The method of claim 16, further comprising:
applying the value of the downlink transmission power adjustment to each downlink message of the one or more downlink messages, wherein the downlink transmission power is based at least in part on applying the value of the downlink transmission power adjustment to each downlink message of the one or more downlink messages.

23. The method of claim 16, further comprising:
applying the value of the downlink transmission power adjustment to one or more resource blocks, one or more symbols, or any combination thereof, corresponding to the one or more downlink messages that at least partially overlap with the one or more uplink messages, wherein the downlink transmission power is based at least in part on applying the value of the downlink transmission power adjustment to each downlink message of the one or more downlink messages.

24. The method of claim 16, further comprising:
applying the value of the downlink transmission power adjustment to one or more resource blocks of the one or more downlink messages based at least in part on a rule, the rule being associated with the one or more downlink messages and the one or more uplink messages satisfying a performance threshold, wherein the downlink transmission power is based at least in part on applying the value of the downlink transmission power adjustment to each downlink message of the one or more downlink messages.

25. The method of claim 16, further comprising:
determining an increase of the downlink transmission power based at least in part on the one or more downlink messages at least partially overlapping in time with the one or more uplink messages, wherein the value of the downlink transmission power adjustment indicates the increase to the downlink transmission power.

26. The method of claim 16, further comprising:
determining a decrease of the downlink transmission power based at least in part on the one or more downlink messages at least partially overlapping in time with the one or more uplink messages, wherein the value of the downlink transmission power adjustment indicates the increase to the downlink transmission power.

27. The method of claim 16, further comprising:
determining that the downlink transmission power is to remain unchanged based at least in part on the one or more downlink messages at least partially overlapping in time with the one or more uplink messages, wherein the value of the downlink transmission power adjustment indicates that the downlink transmission power remains unchanged.

28. An apparatus for wireless communication at a user equipment (UE), comprising:
a processor;
memory coupled with the processor; and
instructions stored in the memory and executable by the processor to cause the apparatus to:
determine that one or more downlink messages to be received from a base station at least partially overlap in time with one or more uplink messages to be transmitted by the UE based at least in part on the UE supporting full-duplex communications;
determine a value of a downlink transmission power adjustment for the one or more downlink messages, wherein the downlink transmission power adjustment is based at least in part on the one or more downlink messages at least partially overlapping in time with the one or more uplink messages; and
receive the one or more downlink messages while simultaneously transmitting the one or more uplink messages, wherein a downlink transmission power of at least one downlink message of the one or more downlink messages is based at least in part on the value of the downlink transmission power adjustment.

29. The apparatus of claim 28, wherein the instructions to determine the value of the downlink transmission power adjustment are executable by the processor to cause the apparatus to:
receive, from the base station, a control message indicating the value of the downlink transmission power adjustment, wherein the value of the downlink transmission power adjustment is determined based at least in part on receiving the control message.

30. An apparatus for wireless communication at a base station, comprising:
a processor;
memory coupled with the processor; and
instructions stored in the memory and executable by the processor to cause the apparatus to:
determine that one or more downlink messages to be transmitted from the base station at least partially overlap in time with one or more uplink messages to be received from a user equipment (UE) based at least in part on the UE supporting full-duplex communications;
configure a value of a downlink transmission power adjustment for the one or more downlink messages, wherein the downlink transmission power adjustment is based at least in part on the one or more downlink messages at least partially overlapping in time with the one or more uplink messages; and
transmit the one or more downlink messages while simultaneously receiving the one or more uplink messages, wherein a downlink transmission power of at least one downlink message of the one or more downlink messages is based at least in part on the value of the downlink transmission power adjustment.

* * * * *